US012492612B2

(12) United States Patent
Stannus et al.

(10) Patent No.: US 12,492,612 B2
(45) Date of Patent: *Dec. 9, 2025

(54) RUPTURE DISC ASSEMBLY

(71) Applicant: NCS MULTISTAGE INC., Calgary (CA)

(72) Inventors: Daniel Stannus, Calgary (CA); Masoud Kalantari, Calgary (CA); Srinivas Gopal Krishna, Calgary (CA); Timothy Johnson, Calgary (CA)

(73) Assignee: NCS MULTISTAGE INC., Calgary (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/806,083

(22) Filed: Aug. 15, 2024

(65) Prior Publication Data
US 2024/0401432 A1 Dec. 5, 2024

Related U.S. Application Data

(63) Continuation of application No. 17/915,965, filed as application No. PCT/CA2021/050407 on Mar. 29, 2021, now Pat. No. 12,091,936.
(Continued)

(51) Int. Cl.
*E21B 7/20* (2006.01)
*E21B 34/06* (2006.01)

(52) U.S. Cl.
CPC ............ *E21B 34/063* (2013.01); *E21B 7/20* (2013.01)

(58) Field of Classification Search
CPC .................................. E21B 7/20; E21B 34/063
See application file for complete search history.

(56) References Cited

U.S. PATENT DOCUMENTS 5,479,986 A * 1/1996 Gano ...................... E21B 33/12
166/292
9,593,542 B2 * 3/2017 Getzlaf ................ E21B 33/146
(Continued)

*Primary Examiner* — Matthew R Buck
(74) *Attorney, Agent, or Firm* — Dorsey & Whitney LLP

(57) ABSTRACT

Disclosed is a rupture disc assembly for use in making a temporary seal in a vessel such as a casing string. The rupture disc assembly may include a rupture disc having a side surface that has a shallow angle taper inward towards a bottom surface of the rupture disc, and a mounting apparatus to support the rupture disc so that the rupture disc forms the temporary seal. When a disc working pressure is applied to a top surface of the rupture disc, engagement/force transmission between the rupture disc and the mounting apparatus produces enough radial compression in the rupture disc due to the shallow angle taper to significantly mitigate or cancel tensile stresses thereby avoiding the rupture disc from breaking. The rupture disc may be configured to break when the rupture disc is subjected to a disc working pressure that is greater than the disc rupture pressure, thereby removing the temporary seal. An axial abutment surface feature may be provided which is configured and operable to limit downward axial movement of the rupture disc relative to said disc support mechanism and thus be operable to restrict the amount of compression said tapered wall surface of said disc support mechanism can exert on said at least a portion of said rupture disc when the top surface of the rupture disc is subjected to said hydraulic pressure within the well.

18 Claims, 14 Drawing Sheets

Related U.S. Application Data

(60) Provisional application No. 63/064,841, filed on Aug. 12, 2020, provisional application No. 63/002,271, filed on Mar. 30, 2020.

(56) References Cited

U.S. PATENT DOCUMENTS

| | | | |
|---|---|---|---|
| 11,149,522 B2* | 10/2021 | Brandsdal | E21B 34/063 |
| 11,293,262 B2* | 4/2022 | Hiorth | E21B 34/063 |
| 12,091,936 B2* | 9/2024 | Stannus | E21B 7/20 |
| 2016/0060998 A1* | 3/2016 | Hiorth | E21B 33/1208 |
| | | | 166/192 |
| 2017/0096875 A1* | 4/2017 | Ravensbergen | E21B 17/00 |
| 2019/0017345 A1* | 1/2019 | Brandsdal | E21B 33/1208 |

* cited by examiner

RUPTURE DISC ASSEMBLY

CROSS REFERENCE TO RELATED APPLICATIONS

This application is a continuation of U.S. Non-provisional patent application Ser. No. 17/915,965 filed on Sep. 29, 2022, which is a National Stage Entry of International Patent Application Serial No. PCT/CA2021/050407 filed on Mar. 29, 2021, which claims the benefit of U.S. Provisional Patent Application Ser. No. 63/002,271 filed on Mar. 30, 2020 and U.S. Provisional Patent Application Ser. No. 63/064,841 filed on Aug. 12, 2020. The contents of the aforementioned applications are incorporated herein by reference.

FIELD

This disclosure relates to a rupture disc assembly for use in making a temporary seal in a vessel, for example in pipe such as for example tubing, casing and drill pipe, used in wellbore applications, such as for example in a casing string to temporarily seal a buoyant chamber beneath the rupture disc assembly in the casing string.

BACKGROUND

A wellbore is a relatively deep and narrow hole that is typically drilled into the ground, often to locate and extract a resource such as water, gas, or oil from a reservoir. A wellbore is often lined with a length of a pipe (often referred to as a casing) to help stabilize the wellbore and/or to prevent fluid loss to the surrounding earth. Nonetheless, it may be difficult to run a casing to great depths in a wellbore because friction between the wellbore and the casing can provide a substantial amount of drag. This is particularly true in horizontal and/or deviated wellbores. In some situations, the drag on the casing can exceed the available weight in a vertical segment of the wellbore. Also, segments in wellbores are not necessarily drilled straight and may end up more helical during drilling, and this may contribute to the drag on the casing as well. If there is insufficient weight in the vertical segment of the wellbore, it may be difficult or impossible to overcome the drag in the wellbore and land the casing at a desired depth, such as for example, the toe of a well. Failing to land the casing at the toe of the wellbore results in a loss of direct access to a formation surrounding the toe of the well, which can reduce a production capacity of the reservoir.

One approach for mitigating casing drag is to lighten or "float" a portion of the casing in the wellbore, thereby creating a buoyant chamber within the casing, for example at a portion of the casing that is meant to be driven around a heel of the wellbore to land in a horizontal segment of the wellbore. The buoyant chamber can span some or all of the horizontal segment, and may also include the heel and a portion of the vertical segment as well. A buoyant chamber can be formed within this portion of the casing by placing two spaced apart seals or plugs within a lower portion to seal in a low density fluid (such as for example air) within the chamber. This buoyant chamber is run into the wellbore and is advanced toward the toe of the well as further joints of casing are added from surface. To drive the casing and buoyant chamber further into the wellbore and past the heel into the horizontal segment of the wellbore, a high density fluid may be pumped into the casing above the buoyant chamber to add weight and drive the casing further toward the toe of the wellbore. This method of floating the horizontal segment of casing reduces drag for the buoyant chamber/casing. After the casing has landed, the plugged ends of the buoyant chamber can be removed, particularly for example, a plug at the up-hole end of the casing, and the low density fluid can be forced out of the wellbore. Cement may then be pumped into an annular space between the wellbore and the casing.

An existing technique for removing the plugged ends of the buoyant chamber is to drill them out. In some cases, a packer is used to seal the casing above the buoyant chamber. The packer may be removed from the casing string using a conventional drill-type workstring, for example. Drilling out the plugged ends of the buoyant chamber adds an operational step to the completion process, increasing completion time cost, and risk.

Another approach is to design a plugged end that can be destroyed without drilling. For example, a plugged end can be configured as a rupture assembly capable of withstanding nominal pressure from the high density fluid while the pipe (e.g. casing) is being moved into the wellbore, but also capable of breaking when subjected to a higher force/pressure, such as a threshold hydraulic pressure that is intentionally produced in the high density fluid using a hydraulic pump for example. In order to sustain high pressures while the pipe (.e.g. casing) is being moved into the wellbore, the rupture disc assembly can be designed to be relatively thick. Any rupture debris resulting from breakage of the rupture assembly can be collected and/or removed.

As completion technology improves, operators may wish to drill deeper/longer wells, and produce from longer horizontal segments under a variety of pressure and temperature conditions without introducing new steps, costs, or operational risks. Therefore, it is desired to continuously improve the performance and reliability of rupture systems used in casing buoyancy applications. Rupture systems that can be adapted to a variety of well applications, and/or that limit the volume and/or particle size of debris released to the wellbore, and/or increase the pressure competency of the rupture assembly would be desirable. High pressure competency of the rupture assembly will allow the buoyant chamber to withstand relatively high hydraulic pressures during the positioning of the casing in the wellbore and may also have a burst/breakage pressure which is significantly higher than the pressure required to activate the mechanism which causes the rupture disc assembly to commence its failure mode/mechanism.

Rupture disc devices are also used in various other applications, including running them on drill pipe during an installation of a liner hanger or in other oilfield/gas field applications.

SUMMARY

In the present disclosure including the claims, the word "vessel" means any body that contains or holds a gas or liquid or mixture thereof, and includes without limitation, a container, and a tubing such as for example a pipe including such as for example a pipe casing or drill pipe such as is used in an oil/gas wellbore. The word "disc" as used in the present disclosure and claims is not restricted to a device that is generally circular or cylindrical or conical in shape.

Disclosed is a rupture disc assembly for use in making a temporary seal in a vessel, for example in a casing string, to temporarily seal a buoyant chamber beneath the rupture disc assembly in the casing string. The rupture disc assembly has a rupture disc that may have each of a top surface, a bottom surface, and a side surface that has a shallow angle taper inward towards the bottom surface of the rupture disc. The rupture disc assembly may also have a mounting apparatus configured to support the rupture disc so that the rupture disc forms the temporary seal in the vessel. The mounting apparatus has a supporting surface that is complementary to the shallow angle taper of the side surface of the rupture disc for engagement between the rupture disc and the mounting apparatus. A rupture disc assembly as referred to herein may be located in a variety of locations in a vessel such as at or in an opening in a side surface of the vessel or at or in a location that serves to partition the vessel.

When during some kind of operation, a disc working pressure is applied to the top surface of the rupture disc from a fluid above the rupture disc assembly in the vessel, the engagement/contact/force transmission between the rupture disc and the mounting apparatus produces enough radial compression in the rupture disc due to the shallow angle taper to significantly mitigate or cancel tensile stresses in the rupture disc, especially on the bottom surface, thereby avoiding the rupture disc from breaking. However, the rupture disc may be configured to break upon the top surface of the rupture disc being subjected to a disc working pressure that is greater than the disc rupture pressure, thereby removing the temporary seal in the vessel.

The shallow angle taper of the rupture disc can result in greater durability for a given thickness of the rupture disc, especially compared to a rupture disc having no taper or a larger angle taper. Therefore, by employing the shallow angle taper, the rupture disc can be designed to have reduced thickness while achieving adequate durability. By reducing the thickness of the rupture disc, the amount of the debris after the rupture disc has been broken can be reduced. In some implementations, the rupture disc is formed of a tempered glass, which can shatter into small pieces upon the rupture pressure. In this way, it is also possible to reduce the size of the debris caused by the rupture disc being shattered. Also, material cost of the rupture disc can be reduced, especially if the thickness of the rupture disc is reduced.

Other aspects and features of the present disclosure will become apparent to those ordinarily skilled in the art, upon review of the following description of the various embodiments of the disclosure.

In accordance with another disclosed aspect there is provided a rupture disc assembly for use in making a temporary seal in a vessel. The rupture disc assembly includes a rupture disc having a top surface, a bottom surface, and a side surface area that has an angle taper inward towards the bottom surface of the rupture disc and a mounting apparatus configured to support the rupture disc. The mounting apparatus and rupture disc are operable to form a temporary seal in the vessel, with the mounting apparatus having a tapered supporting surface area that is complementary to the angle taper of the side surface area of the rupture disc. The side surface area of the rupture disc and the supporting surface area of the mounting apparatus are operable to permit transmission of radial compressive forces from the mounting apparatus to the rupture disc. The angle of the angle taper is selected to produce sufficient radial compression against the support surface when pressure is applied to the top surface of the rupture disc, to significantly mitigate or cancel tensile stresses in the rupture disc. The rupture disc assembly is operable such that the rupture disc has mitigated or cancelled tensile stresses and remains intact when the top surface of the rupture disc is subjected to a first disc working pressure (that may be a maximum disc working pressure) during a first operational mode of the rupture disc assembly, the first disc working pressure being below a disc rupture pressure. The rupture disc is operable to break during a second operational mode of the rupture disc assembly. In some embodiments, the rupture disc assembly further includes an axial abutment surface feature configured and operable to limit downward axial movement of the rupture disc relative to the mounting apparatus, and thus limit the amount of radial compressive forces that can be transmitted from the mounting apparatus to the rupture disc, when the top surface of the rupture disc is subjected to the first disc working pressure.

In accordance with another disclosed aspect there is provided an apparatus for forming a chamber in a well. The apparatus includes a length of tubing positionable in the well and having an uphole end and a downhole end, the downhole end configured for connection to a float device for forming a lower boundary of the chamber. The apparatus also includes a rupture disc assembly disposed at or towards the uphole end of the tubing, forming an upper boundary of the chamber. The rupture disc having a sealing mode and a disc failure mode, such that when the rupture disc is in the sealing mode, the rupture disc is in sealing engagement within the tubing to form the upper boundary of the chamber. The rupture disc has a top surface area, a bottom surface area, and a side surface area, the side surface area having at least a portion that is inwardly tapered (which may be a shallow taper) towards the bottom surface area. The apparatus also includes a disc support mechanism including a tapered wall surface operable for mating direct or indirect abutment with the inwardly tapered surface area of the rupture disc when the rupture disc is in the sealing mode. In response to application of hydraulic pressure within the well on the top surface area of the rupture disc in the sealing mode, the tapered wall surface of the disc support mechanism exerts compression on at least a portion of the rupture disc to counteract tensile stresses resulting from the application of the hydraulic pressure. The apparatus also includes a disc failure activation mechanism operable to selectively cause the rupture disc to change from the sealing mode to the disc failure mode, such that when the rupture disc changes to the failure mode the rupture disc breaks. In some embodiments, the apparatus may also include an axial abutment surface feature configured and operable to limit downward axial movement of the rupture disc relative to the disc support mechanism and thus be operable to restrict the amount of compression the tapered wall surface of the disc support mechanism can exert on the at least a portion of the rupture disc when the top surface of the rupture disc is subjected to the hydraulic pressure within the well.

In accordance with another disclosed aspect there is provided a float tool configured for use in a tubing positionable within a wellbore containing a well fluid. The tubing has an internal diameter that defines a fluid passageway between an upper portion of the tubing and a lower portion of the tubing and the wellbore having an upper, substantially vertical segment, a lower, substantially horizontal segment, and a bend portion connecting the upper and lower portions. The float tool includes a rupture disc assembly which includes a rupture disc having a sealing mode and a disc failure mode, such that when the rupture disc is in the sealing mode, the rupture disc is in sealing engagement within the tubing to form the upper boundary of the chamber. The rupture disc has a top surface area, a bottom surface area, and a side surface area, the side surface area having at least a portion that is inwardly tapered (which may be a shallow taper) towards the bottom surface area. The rupture disc assembly also includes a disc support mechanism including a tapered wall surface operable for mating force transmission with the inwardly tapered surface area of the rupture disc when the rupture disc is in the sealing mode. In response to application of hydraulic pressure within the tubing on the top surface area of the rupture disc in the sealing mode, the tapered wall surface of the disc support mechanism exerts compression on at least a portion of the rupture disc to counteract tensile stresses resulting from the application of the hydraulic pressure. The rupture disc assembly also includes a disc failure activation mechanism operable to selectively cause the rupture disc to change from the sealing mode to the disc failure mode, such that when the rupture disc changes to the failure mode the rupture disc will break. In some embodiments, the rupture disc assembly may also include an axial abutment surface feature configured and operable to limit downward axial movement of the rupture disc relative to the disc support mechanism and thus be operable to restrict the amount of compression the tapered wall surface of the disc support mechanism can exert on the at least a portion of the rupture disc when the top surface of the rupture disc is subjected to the hydraulic pressure within the well.

In accordance with another disclosed aspect there is provided casing string float assembly including a tubular having a seal at a lower end and a rupture disc assembly disposed at or towards an upper end of the casing string, the rupture disc forming an upper boundary of a float chamber. The rupture disc assembly includes a rupture disc having a sealing mode and a disc failure mode, such that when the rupture disc is in the sealing mode, the rupture disc is in sealing engagement within the tubing to form the upper boundary of the chamber. The rupture disc has a top surface area, a bottom surface area, and a side surface area, the side surface area having at least a portion that is inwardly tapered (which may be a shallow taper) towards the bottom surface area. The rupture disc assembly also includes a disc support mechanism including a tapered wall surface operable for mating force transmission with the inwardly tapered surface area of the rupture disc when the rupture disc is in the sealing mode within the tubular. In response to application of hydraulic pressure within the well on the top surface area of the rupture disc in the sealing mode, the tapered wall surface of the disc support mechanism exerts radial compression on at least a portion of the rupture disc to counteract tensile stresses resulting from the application of the hydraulic pressure. The rupture disc assembly also includes a disc failure activation mechanism operable to selectively cause the rupture disc to change from the sealing mode to the disc failure mode, such that when the rupture disc changes to the failure mode the rupture disc will break. In some embodiments, the rupture disc assembly may also include an axial abutment surface feature configured and operable to limit downward axial movement of the rupture disc relative to the disc support mechanism and thus be operable to restrict the amount of radial compression the tapered wall surface of the disc support mechanism can exert on the at least a portion of the rupture disc when in operation, the top surface of the rupture disc is subjected to the hydraulic pressure within the well.

In accordance with another disclosed aspect there is provided an apparatus for forming a temporary seal in a vessel. The apparatus includes a rupture disc having a sealing mode and a disc failure mode. The rupture disc has a top surface area, a bottom surface area, and a side surface area, the side surface area having at least a portion that is inwardly tapered towards (which may be a shallow taper) the bottom surface area. The apparatus also includes a disc support mechanism including a tapered wall surface operable for mating force transmission with the inwardly tapered surface area of the rupture disc when the rupture disc is in the sealing mode. In response to application of pressure on the top surface area of the rupture disc in the sealing mode, the tapered wall surface of the disc support mechanism exerts radial compression on at least a portion of the rupture disc to counteract tensile stresses resulting from the application of the pressure. The apparatus also includes a disc failure activation mechanism operable to selectively cause the rupture disc to change from the sealing mode to the disc failure mode, such that when the rupture disc changes to the failure mode the rupture disc breaks. In some embodiments, the apparatus may also include an axial abutment surface feature configured and operable to limit downward axial movement of the rupture disc relative to the disc support mechanism and thus be operable to restrict the amount of radial compression the tapered wall surface of the disc support mechanism can exert on the at least a portion of the rupture disc when the top surface of the rupture disc is subjected to the hydraulic pressure within the well.

In accordance with another disclosed aspect there is provided a method of opening a buoyant chamber in a wellbore. The buoyant chamber is formed within a length of tubing in the wellbore and having an up-hole end region and a downhole end region, the downhole end region of the tubing having an apparatus that provides a lower boundary of the buoyant chamber. The up-hole end of the tubing has a rupture disc assembly that provides an upper boundary of the buoyant chamber. The rupture disc assembly includes a rupture disc having a sealing mode and a disc failure mode. When the rupture disc is in the sealing mode, the rupture disc is in sealing engagement within the tubing to form the upper boundary of the chamber. The rupture disc has a top surface area, a bottom surface area, and a side surface area, the side surface area having at least a portion that is inwardly tapered (which may be a shallow taper) towards the bottom surface area. The rupture disc assembly also includes a disc support mechanism including a tapered wall surface operable for mating engagement with the inwardly tapered surface area of the rupture disc when the rupture disc is in the sealing mode within the tubular. In response to application of hydraulic pressure within the well on the top surface area of the rupture disc in the sealing mode, the tapered wall surface of the disc support mechanism exerts radial compression on at least a portion of the rupture disc to counteract tensile stresses resulting from the application of the hydraulic pressure. The rupture disc assembly also includes a disc failure activation mechanism operable to selectively cause the rupture disc to change from the sealing mode to the disc failure mode, such that when the rupture disc changes to the failure mode the rupture disc will break. In some embodiments, the rupture disc assembly may also include an axial abutment surface feature configured and operable to limit downward axial movement of the rupture disc relative to the disc support mechanism and thus be operable to restrict the amount of compression the tapered wall surface of the disc support mechanism can exert on the at least a portion of the rupture disc when the top surface of the rupture disc is subjected to the hydraulic pressure within the well. The method involves applying an activation hydraulic pressure to the upper surface of the disc that is greater than a maximum disc working pressure reached during the placement of the tubing into the wellbore, the activation hydraulic pressure being less than a disc rupture pressure of the disc. The application of the hydraulic pressure causes the disc failure activation mechanism to be activated to cause the rupture disc to change to the disc failure mode to cause the rupture disc to break.

In accordance with another disclosed aspect there is provided a method of opening a temporary seal formed in an opening in a vessel. The temporary seal is formed with an apparatus including a rupture disc having a sealing mode and a disc failure mode. The rupture disc having a top surface area, a bottom surface area, and a side surface area, the side surface area having at least a portion that is inwardly tapered (which may be a shallow taper) towards the bottom surface area. The apparatus also includes a disc support mechanism including a tapered wall surface operable for mating engagement with the inwardly tapered surface area of the rupture disc when the rupture disc is in the sealing mode in the opening to provide the temporary seal. In response to application of pressure on the top surface area of the rupture disc in the sealing mode, the tapered wall surface of the disc support mechanism exerts radial compression on at least a portion of the rupture disc to counteract tensile stresses resulting from the application of the pressure. The apparatus also includes a disc failure activation mechanism operable to selectively cause the rupture disc to change from the sealing mode to the disc failure mode, such that when the rupture disc changes from the sealing mode to the failure mode the rupture disc is caused to break. In some embodiments, the apparatus may also include an axial abutment surface feature configured and operable to limit downward axial movement of the rupture disc relative to the disc support mechanism and thus be operable to restrict the amount of compression the tapered wall surface of the disc support mechanism can exert on the at least a portion of the rupture disc when the top surface of the rupture disc is subjected to the hydraulic pressure within the well. The method involves applying an activation pressure to the upper surface of disc, the activation hydraulic pressure being less than the disc rupture pressure of the disc. Application of the hydraulic pressure causes the disc failure activation mechanism to be activated to cause the rupture disc to change from the sealing mode to the disc failure mode to cause the rupture disc to break.

In accordance with one disclosed aspect there is provided a rupture disc assembly for use in making a temporary seal in a vessel. The rupture disc assembly includes a rupture disc having a top surface, a bottom surface, and a side surface area that has a shallow angle taper inward towards the bottom surface of the rupture disc and a mounting apparatus configured to support the rupture disc. The mounting apparatus and rupture disc are operable to form a temporary seal in the vessel, with the mounting apparatus having a tapered supporting surface area that is complementary to the shallow angle taper of the side surface area of the rupture disc. The side surface area of the rupture disc and the supporting surface area of the mounting apparatus are operable to permit transmission of radial compressive forces from the mounting apparatus to the rupture disc. The angle of the shallow angle taper is selected to produce sufficient radial compression against the support surface when pressure is applied to the top surface of the rupture disc, to significantly mitigate or cancel tensile stresses in the rupture disc. The rupture disc assembly is operable such that the rupture disc has mitigated or cancelled tensile stresses and remains intact when the top surface of the rupture disc is subjected to a first disc working pressure (that may be a maximum disc working pressure) during a first operational mode of the rupture disc assembly, the first disc working pressure being below a disc rupture pressure. The rupture disc is operable to break during a second operational mode of the rupture disc assembly.

In accordance with another disclosed aspect there is provided an apparatus for forming a chamber in a well. The apparatus includes a length of tubing positionable in the well and having an uphole end and a downhole end, the downhole end configured for connection to a float device for forming a lower boundary of the chamber. The apparatus also includes a rupture disc assembly disposed towards the uphole end of the tubing forming an upper boundary of the chamber. The rupture disc having a sealing mode and a disc failure mode, such that when the rupture disc is in the sealing mode, the rupture disc is in sealing engagement within the tubing to form the upper boundary of the chamber. The rupture disc has a top surface area, a bottom surface area, and a side surface area, the side surface area having at least a portion that is inwardly shallow tapered towards the bottom surface area. The apparatus also includes a disc support mechanism including a tapered wall surface operable for mating direct or indirect abutment with the inwardly shallow tapered surface area of the rupture disc when the rupture disc is in the sealing mode. In response to application of hydraulic pressure within the well on the top surface area of the rupture disc in the sealing mode, the tapered wall surface of the disc support mechanism exerts compression on at least a portion of the rupture disc to counteract tensile stresses resulting from the application of the hydraulic pressure. The apparatus also includes a disc failure activation mechanism operable to selectively cause the rupture disc to change from the sealing mode to the disc failure mode, such that when the rupture disc changes to the failure mode the rupture disc breaks.

In accordance with another disclosed aspect there is provided a float tool configured for use in a tubing positionable within a wellbore containing a well fluid. The tubing has an internal diameter that defines a fluid passageway between an upper portion of the tubing and a lower portion of the tubing and the wellbore having an upper, substantially vertical segment, a lower, substantially horizontal segment, and a bend portion connecting the upper and lower portions. The float tool includes a rupture disc assembly which includes a rupture disc having a sealing mode and a disc failure mode, such that when the rupture disc is in the sealing mode, the rupture disc is in sealing engagement within the tubing to form the upper boundary of the chamber. The rupture disc has a top surface area, a bottom surface area, and a side surface area, the side surface area having at least a portion that is inwardly shallow tapered towards the bottom surface area. The rupture disc assembly also includes a disc support mechanism including a tapered wall surface operable for mating force transmission with the inwardly shallow tapered surface area of the rupture disc when the rupture disc is in the sealing mode. In response to application of hydraulic pressure within the tubing on the top surface area of the rupture disc in the sealing mode, the tapered wall surface of the disc support mechanism exerts compression on at least a portion of the rupture disc to counteract tensile stresses resulting from the application of the hydraulic pressure. The rupture disc assembly also includes a disc failure activation mechanism operable to selectively cause the rupture disc to change from the sealing mode to the disc failure mode, such that when the rupture disc changes to the failure mode the rupture disc will break.

In accordance with another disclosed aspect there is provided casing string float assembly including a tubular having a seal at a lower end and a rupture disc assembly at an upper end of the casing string, the rupture disc forming an upper boundary of a float chamber. The rupture disc assembly includes a rupture disc having a sealing mode and a disc failure mode, such that when the rupture disc is in the sealing mode, the rupture disc is in sealing engagement within the tubing to form the upper boundary of the chamber. The rupture disc has a top surface area, a bottom surface area, and a side surface area, the side surface area having at least a portion that is inwardly shallow tapered towards the bottom surface area. The rupture disc assembly also includes a disc support mechanism including a tapered wall surface operable for mating force transmission with the inwardly shallow tapered surface area of the rupture disc when the rupture disc is in the sealing mode within the tubular. In response to application of hydraulic pressure within the well on the top surface area of the rupture disc in the sealing mode, the tapered wall surface of the disc support mechanism exerts radial compression on at least a portion of the rupture disc to counteract tensile stresses resulting from the application of the hydraulic pressure. The rupture disc assembly also includes a disc failure activation mechanism operable to selectively cause the rupture disc to change from the sealing mode to the disc failure mode, such that when the rupture disc changes to the failure mode the rupture disc will break.

In accordance with another disclosed aspect there is provided an apparatus for forming a temporary seal in a vessel. The apparatus includes a rupture disc having a sealing mode and a disc failure mode. The rupture disc has a top surface area, a bottom surface area, and a side surface area, the side surface area having at least a portion that is inwardly shallow tapered towards the bottom surface area. The apparatus also includes a disc support mechanism including a tapered wall surface operable for mating force transmission with the inwardly shallow tapered surface area of the rupture disc when the rupture disc is in the sealing mode. In response to application of pressure on the top surface area of the rupture disc in the sealing mode, the tapered wall surface of the disc support mechanism exerts radial compression on at least a portion of the rupture disc to counteract tensile stresses resulting from the application of the pressure. The apparatus also includes a disc failure activation mechanism operable to selectively cause the rupture disc to change from the sealing mode to the disc failure mode, such that when the rupture disc changes to the failure mode the rupture disc breaks.

In accordance with another disclosed aspect there is provided a method of opening a buoyant chamber in a wellbore. The buoyant chamber is formed within a length of tubing in the wellbore and having an up-hole end and a downhole end, the downhole end of the tubing having an apparatus that provides a lower boundary of the buoyant chamber. The up-hole end of the tubing has a rupture disc assembly that provides an upper boundary of the buoyant chamber. The rupture disc assembly includes a rupture disc having a sealing mode and a disc failure mode. When the rupture disc is in the sealing mode, the rupture disc is in sealing engagement within the tubing to form the upper boundary of the chamber. The rupture disc has a top surface area, a bottom surface area, and a side surface area, the side surface area having at least a portion that is inwardly shallow tapered towards the bottom surface area. The rupture disc assembly also includes a disc support mechanism including a tapered wall surface operable for mating engagement with the inwardly shallow tapered surface area of the rupture disc when the rupture disc is in the sealing mode within the tubular. In response to application of hydraulic pressure within the well on the top surface area of the rupture disc in the sealing mode, the tapered wall surface of the disc support mechanism exerts radial compression on at least a portion of the rupture disc to counteract tensile stresses resulting from the application of the hydraulic pressure. The rupture disc assembly also includes a disc failure activation mechanism operable to selectively cause the rupture disc to change from the sealing mode to the disc failure mode, such that when the rupture disc changes to the failure mode the rupture disc will break. The method involves applying an activation hydraulic pressure to the upper surface of the disc that is greater than a maximum disc working pressure reached during the placement of the tubing into the wellbore, the activation hydraulic pressure being less than a disc rupture pressure of the disc. The application of the hydraulic pressure causes the disc failure activation mechanism to be activated to cause the rupture disc to change to the disc failure mode to cause the rupture disc to break.

In accordance with another disclosed aspect there is provided a method of opening a temporary seal formed in an opening in a vessel. The temporary seal is formed with an apparatus including a rupture disc having a sealing mode and a disc failure mode. The rupture disc having a top surface area, a bottom surface area, and a side surface area, the side surface area having at least a portion that is inwardly shallow tapered towards the bottom surface area. The apparatus also includes a disc support mechanism including a tapered wall surface operable for mating engagement with the inwardly shallow tapered surface area of the rupture disc when the rupture disc is in the sealing mode in the opening to provide the temporary seal. In response to application of pressure on the top surface area of the rupture disc in the sealing mode, the tapered wall surface of the disc support mechanism exerts radial compression on at least a portion of the rupture disc to counteract tensile stresses resulting from the application of the pressure. The apparatus also includes a disc failure activation mechanism operable to selectively cause the rupture disc to change from the sealing mode to the disc failure mode, such that when the rupture disc changes from the sealing mode to the failure mode the rupture disc is caused to break. The method involves applying an activation pressure to the upper surface of disc, the activation hydraulic pressure being less than the disc rupture pressure of the disc. Application of the hydraulic pressure causes the disc failure activation mechanism to be activated to cause the rupture disc to change from the sealing mode to the disc failure mode to cause the rupture disc to break.

BRIEF DESCRIPTION OF THE DRAWINGS

Embodiments will now be described with reference to the attached drawings in which.

DETAILED DESCRIPTION OF EMBODIMENTS

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Float Tool

Figure 1:
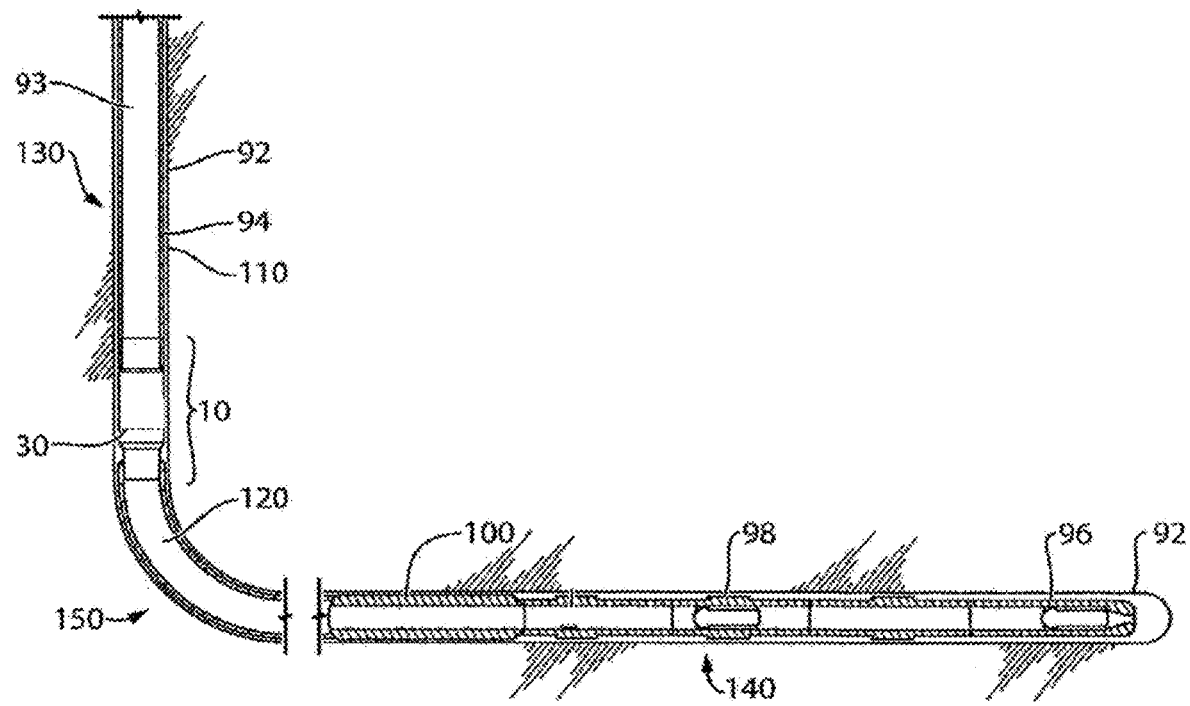
FIG. 1 is a cross-sectional drawing of a float tool with a rupture disc assembly installed within a casing string in a wellbore.

Referring first to FIG. 1, shown is a cross-sectional drawing of a float tool comprising a rupture disc assembly 10 installed as part of a casing string 94 in a wellbore 92. In the illustrated example, the wellbore 92 is shown as a relatively deep and narrow hole, including a vertical segment 130 and a horizontal segment 140, although other deviated wellbores of varying shapes are possible. The wellbore 92 may contain fluid such as drilling mud (not shown) and the well is continuous with a reservoir containing producible fluid such as for example, ground water, oil and/or gas. In the illustrated example, the float tool has already been run into the wellbore 92, with some small space between the casing string 94 and the wellbore 92, resulting in an annulus 110. It is to be understood that the float tool is very specific and is provided merely as an example.

The rupture disc assembly 10, when in a sealing mode, forms a temporary isolation barrier, isolating a fluid-filled upper section 93 of the casing string 94 from a buoyant chamber 120 formed in the casing string 94 between the rupture disc assembly 10 and a sealing device, such as a float shoe 96 disposed at a lower end of the casing string 94. In the illustrated example, the rupture disc assembly 10 is installed in the casing string 94 such that it is positioned in the vertical segment 130 of the wellbore 92, proximal to a bend 150 leading to the horizontal segment 140 of the wellbore 92. Variations in the placement of the rupture disc assembly 10 are possible. Generally, the rupture disc assembly 10 should be installed to increase or maximize vertical weight on the casing string 94 via the fluid-filled upper section 93, while reducing or minimizing horizontal weight and drag/friction with the casing via the buoyant chamber 120, by floating a portion of the casing in the wellbore.

In some implementations, the buoyant chamber 120 is filled with air, which can reduce an amount of weight needed in the fluid-filled upper section 93 to run the casing string 94 into the wellbore 92. However, other fluids of lesser density than the fluid in the fluid-filled upper section 93 can be used in the buoyant chamber 120. For example, in some implementations, the buoyant chamber 120 is filled with a gas such as nitrogen, carbon dioxide, or other suitable gas. Light liquids may also be possible, for example gas condensate. Generally, the buoyant chamber 120 is filled with fluid that has a lower specific gravity than well fluid in the wellbore 92, and generally the choice of which gas or liquid to use is dependent on factors such as well conditions and an amount of buoyancy that is desired.

The rupture disc assembly 10 includes a rupture disc 30 that will change from a sealing mode, to a disc failure mode in which it may be ruptured at a subsequent point in time, as will be discussed below. The rupture disc 30 may generally be a disc (that will typically be a circular disc 36 to match the shape of the wellbore) and that has a disc rupture pressure (e.g. a pressure at which hydraulic pressure alone applied to the pressure facing surface can break the disc) that is greater than a typical disc working pressure range in the casing string 94 when the casing string 94 is being run into the wellbore, so as to avoid undesired breakage of the rupture disc 30. A distance between the float shoe 96 and the rupture disc assembly 10 may be selected to provide a sufficient buoyancy force tending to run the casing string 94 into the wellbore 92, and to increase or maximize the vertical weight of the casing string 94 via the fluid-filled upper section 93, as noted above.

The float shoe 96 may form a lower boundary of the buoyant chamber 120. As will be appreciated, an alternative float device, such as a float collar 98, may be used as a substitute for the float shoe 96, or may be used in addition to the float shoe 96. Float shoes, float collars and similar devices are herein referred to as "float devices". In the illustrated example, both the float shoe 96 and the float collar 98 are included. In some implementations, the float collar 98 is positioned up-hole of the float shoe 96. When present, the float collar 98 serves as a redundant fluid inflow prevention means. The float collar 98 is similar in construction to the float shoe 96, including a valve (not shown) that prevents wellbore fluid from entering the buoyant chamber 120. Similarly, the float shoe 96 generally includes a check valve (not shown) that prevents inflow of fluid from the wellbore during running in or lowering the casing string into the wellbore.

Float shoes are generally known in the art. For example, U.S. Pat. Nos. 2,117,318 and 2,008,818 describe float shoes. Float shoes may be closed by assistance with a spring. Once closed, pressure outside the float shoe may keep the shoe closed. In some float shoes, its check valve can be opened when fluid flow through the casing string is desired, for example, when cementing operations are to begin. In some cases, the float shoe may be drilled out after run-in is complete. When present, the float collar often has a landing surface for a wiper displacement plug. In addition to a float shoe and/or float collar, a baffle collar and/or guide shoe may be present. The float tool comprising rupture disc assembly 10 shown in the illustrated example can be adapted to be compatible with most float shoes, landing collars and float collars.

In some implementations, the landing collar 100 is positioned between the float shoe 96 and the rupture disc assembly 10. The landing collar 100 can be present on a surface of the float collar 98, when present. The landing collar 100 may be generally used in cementing operations for receiving cementing plugs, such as a wiper plug. Suitable landing collars are known in the art, and the float tool 100 does not require that a particular landing collar be used, so long as the landing collar has surface for receiving a plug and so long as the landing collar can be suitably installed on the casing string.

Pressure Definitions

In this disclosure the following terms have the meanings as follows:
1. Disc Rupture Pressure means the minimum threshold pressure level at which, when applied to the top surface of rupture disc 30, causes rupture disc 30 to break/fail.
2. Disc Working Pressure means the actual pressure that is being applied, at any particular time, to the top surface of rupture disc 30 during a particular working operation (e.g. the actual hydraulic pressure that is applied at a particular time to the top side of rupture disc 30 when the casing string with buoyancy chamber is being run into the wellbore).
3. Disc Failure Trigger Pressure means the minimum threshold pressure level at which, when applied to the top side of rupture disc 30, the disc failure activation mechanism is triggered/activated.

In the described following implementations, note the following which will be explained in greater detail further below.
1. The maximum Disc Working Pressure during an operation does not exceed the Disc Rupture pressure.
2. The Disc Working Pressure reaches/exceeds the Disc Failure Trigger Pressure when it is desired to activate the disc failure mechanism.
3. When the disc failure activation mechanism is activated, the rupture disc 30 may fail as a result of the hydraulic pressure being applied to the top surface of rupture disc 30 exceeding the Disc Rupture Pressure; or rupture disc 30 may fail as a result of other forces/ pressures applied to the rupture disc as a result of the disc failure mechanism being activated.

Rupture Disc Assembly

Figure 2:
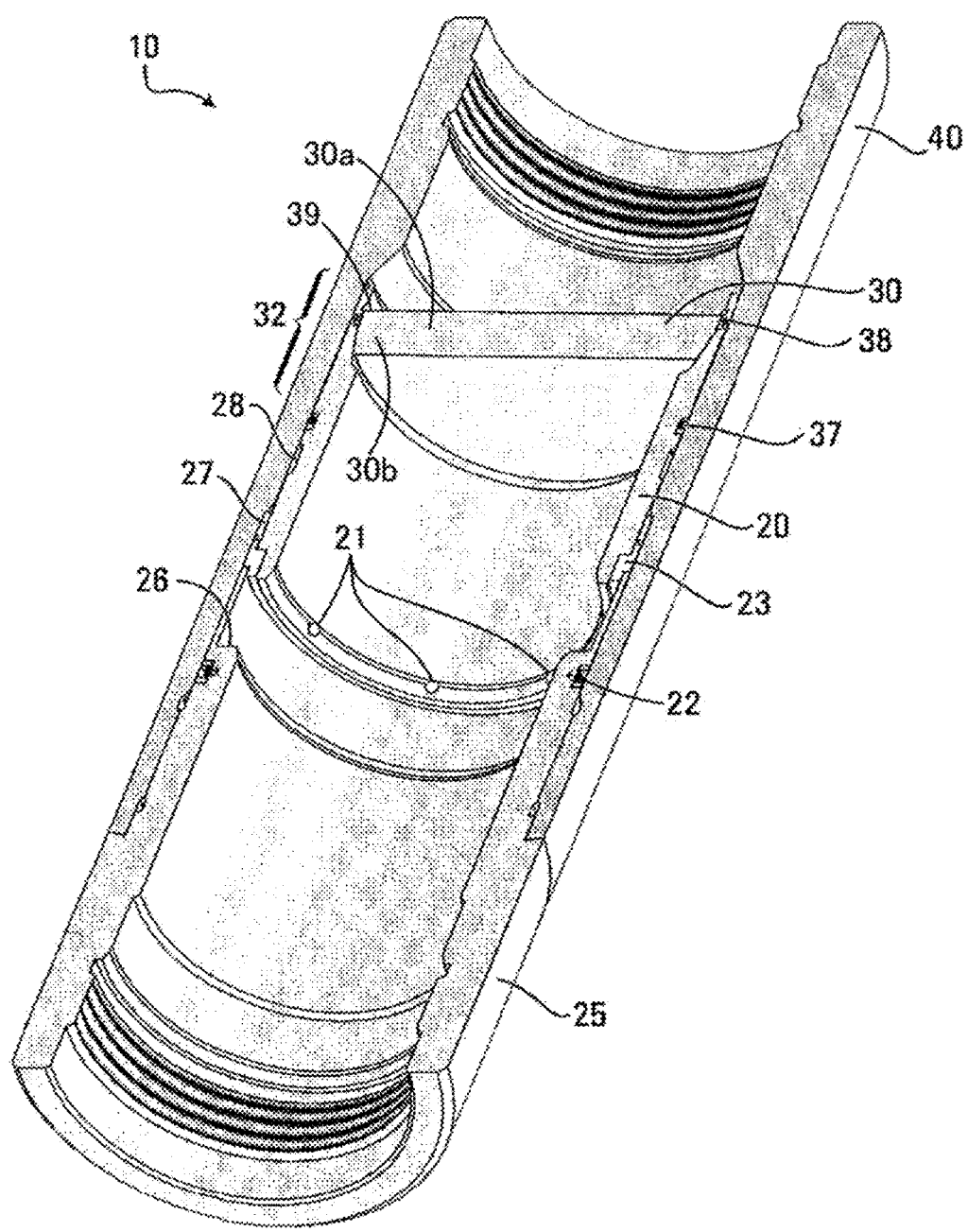
FIG. 2 is a cutaway drawing of the rupture disc assembly shown in FIG. 1.
Figure 3:
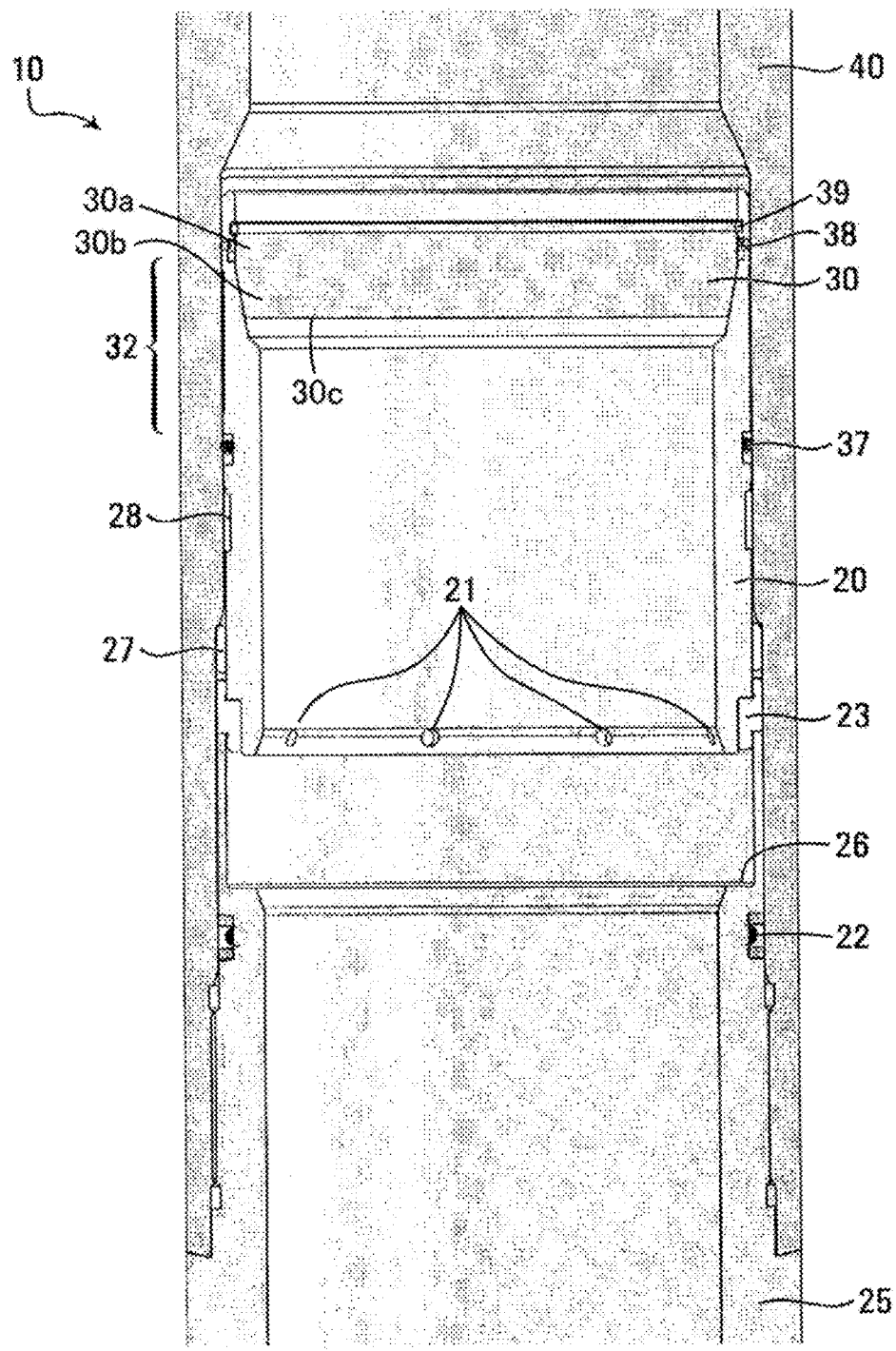
FIG. 3 is a cross-sectional drawing of the rupture disc assembly shown in FIG. 2.

Referring now to FIGS. 2 and 3, shown are a cutaway drawing (FIG. 2) and a cross sectional drawing (FIG. 3) of the rupture disc assembly 10 shown in FIG. 1. The rupture disc assembly 10 may be formed as part of the casing string 94 and includes the rupture disc 30. The rupture disc 30 may be generally circular in shape and has a top surface, a bottom surface 30c, and a side surface that may have an upper cylindrical portion 30a and a lower truncated conical portion 30b with a shallow angle taper directed inwards towards the bottom surface 30c of the rupture disc 30. A disc failure activation mechanism may be provided and may include a mounting apparatus 20, 25 and 40 that is configured to support the rupture disc 30, such that the bottom surface 30c of the rupture disc 30 faces the buoyant chamber 120 while the top surface faces the fluid-filled upper section 93.

In the illustrated example, the mounting apparatus 20, 25 and 40 includes a traveling sled 20, and a housing 25 and 40. The housing 25 and 40 includes a lower tubular member 25 defining a lower fluid passageway through its interior for the buoyant chamber 120, and an upper tubular member 40 defining an upper fluid passageway through its interior for the fluid-filled upper section 93. The traveling sled 20 has a supporting surface that is complementary to, and mates with, the shallow angle taper portion 30b of the side surface of the rupture disc 30. This enables contact/engagement between the rupture disc 30 and the traveling sled 20 when the rupture disc 30 is subjected to hydraulic pressure from the fluid-filled upper section 93 as is described in further detail below. In some implementations, there is no contact between the cylindrical surface portion 30a of the rupture disc 30 and the opposed, inward facing cylindrical surface of the sled 20.

When during an operation such as running a casing with a buoyant chamber into a wellbore, a disc working pressure is applied to the top surface of an un-tapered rupture disc, the top surface region of the disc may be in compression, whilst the bottom surface 30c region may be in tension. However, according to an embodiment of the disclosure, when a disc working pressure is applied across the top surface of the rupture disc 30 from fluid in the fluid-filled upper section 93, the engagement/abutment/force transmission between the angle tapered surface of the rupture disc 30 and the supporting angled surface of the traveling sled 20 produces enough radial compression in the bottom surface region, particularly on the bottom surface 30c of the rupture disc 30 due to supporting pressure of the traveling sled 20 against the shallow angle taper to significantly counteract or even cancel out the tensile stresses in the rupture disc 30, especially on the bottom surface 30c. This results in an overall ability of the rupture disc 30 to withstand higher hydraulic forces applied against its upper surface before bursting/ breaking, than if there were no significant radial compression in the lower region of the rupture disc 30 caused by the mating tapered surfaces. It should be noted that, in some embodiments, these mating tapered contact surfaces on the rupture disc 30 and traveling sled 20 are the only functional contact surfaces between sled 20 and rupture disc 30.

If the rupture disc 30 is not provided with a taper at the upper cylindrical portion of the side surface of rupture disc 30, the top surface region of the rupture disc will not be put under any further compression by virtue of the interaction of the side surface of the rupture disc and the complementary non-tapered surface of the traveling sled 20. It is typically desirable to avoid any additional compression in the top region of the rupture disc 30 that could cause compression failure of rupture disc 30. By not adding further compression, one can avoid a possibility of rupture disc 30 shattering/breaking due to compression failure when the casing string 94 is being run into the ground and the disc working pressure associated with such an operation is applied. However, as described below, a failure mechanism/mode of the rupture disc 30 is configured to be activated (resulting in the shatter of the rupture disc 30) when the rupture disc 30 is subject to a disc working pressure that reaches or exceeds the disc failure trigger pressure (but which is lower than disc rupture pressure) causing a failure pressure/force to the applied to the rupture disc 30 that causes the rupture disc 30 to shatter.

In order to reduce or possibly substantially eliminate tensile stresses in the rupture disc 30 while it is under hydraulic pressure from up-hole/above, the shallow angle taper of the rupture disc (and corresponding taper of the mating surface of the traveling sled 20) may be carefully designed and may be configured to create a load condition in the rupture disc 20 that is very similar to the load condition of a keystone in an arch. In the illustrated example, the shallow angle taper on the side surface of the rupture disc 30 is approximately 10 degrees. However, more generally, the "shallow angle taper" can include any suitable angled taper that is small enough so that tensile stresses are significantly mitigated and possibly cancelled in the rupture disc 30, especially on the bottom surface 30c, but not so small that the rupture disc 30 can be pushed right through the travelling sled 20, by deformation of the mating surfaces. Thus, the mating tapering surfaces result in a supportive axial compression forces in an up-hole direction being exerted by the tapered surface of the sled 20, on the tapered surface of the rupture disc 30. In some implementations, the radial compression on the rupture disc 30 is significantly (e.g. at least 2×) greater than the supportive axial compression which prevents the rupture disc 30 from accelerating/moving downhole relative to sled 20. In some implementations, the shallow angle taper of the rupture disc 30 is within a range of 3 degrees to 30 degrees, more preferably 3 degrees to 20 degrees, more preferably 5 degrees to 15 degrees, and more preferably 8 degrees to 12 degrees. In very specific implementations, the shallow angle taper is approximately 10 degrees as depicted.

In some implementations, the shallow angle taper of the rupture disc 30 is disposed on only the lower portion of the side surface such that, during the engagement between the rupture disc 30 and the travelling sled 20, the radial compression is focused near the bottom surface 30*c* of the rupture disc 30. This taper may be restricted to or focus on generally the region below and around the neutral bending axis or neutral bending region(s) of the rupture disc 30 or generally on those regions where there are tensile stresses created by the hydraulic top surface loading, as the regions above the neutral axis are naturally in compression because of bending. By focusing the radial compression near the bottom surface 30*c* of the rupture disc 30, tensile stresses are significantly mitigated or possibly even completely cancelled. This can significantly reduce tensile stresses in the rupture disc 30, especially on the bottom surface 30*c*, which can result in greater durability (i.e. a higher pressure rating) for a given thickness of the rupture disc 30. This is particularly beneficial when rupture disc 30 is made from a material which is relatively strong when subjected to compressive forces/strains, but relatively not strong when subjected to tensile stresses.

In some implementations, the shallow angle taper on the lower portion of the side surface of the rupture disc 30 spans more than half of the thickness of the rupture disc 30. This can ensure that enough of the rupture disc 30 is in compression to significantly mitigate or cancel tensile stresses in the rupture disc 30, especially on the bottom surface 30*c*. For example, 60 percent of the thickness of the rupture disc 30 can be tapered. As another example, 67 percent of the thickness can be tapered. Such implementations can enable a large volume of the rupture disc 30 to be in compression at the time of breakage/failure and can enable at least a lower half of the rupture disc 30 to be in compression. In addition, it is desirable that the top surface of the rupture disc 30 is in compression when for example, during the failure mode, a hydraulic pressure is applied to the top surface of the rupture disc 30 that is greater than the disc rupture pressure (e.g. from the water hammer effect) to break the rupture disc 30. If this does not occur, the rupture disc 30 may not shatter into fine debris, even when tempered glass is used for the rupture disc 30.

In some implementations, the upper portion 30*a* of the side surface of the rupture disc 30 is not tapered (e.g. it is cylindrical). In some implementations, there is no contact between the upper portion 30*a* of the side surface and the supporting surface of the traveling sled 20, especially when the rupture disc 30 is being pushed into the traveling sled 20. However, there is contact between the lower portion 30*b* of the side surface and the supporting surface of the traveling sled 20. In this way, the supporting surface is complementary to the shallow angle taper of the side surface 30*a* of the rupture disc 30 for engagement between the rupture disc 30 and the traveling sled 20.

The shallow angle taper of the rupture disc 30 increases the disc rupture pressure at which the rupture disc 30 will shatter/break. Therefore, to maintain the same disc rupture pressure, the thickness of the rupture disc 30 can be decreased. The rupture disc 30 may be designed with the tapered surface and have a relatively reduced thickness while still achieving adequate durability (i.e. adequate pressure rating). Advantageously, by reducing the thickness for the rupture disc 30, the amount and size of the debris after the rupture disc 30 has been shattered can be reduced. Also, the material cost of the rupture disc 30 can be reduced.

In some implementations, contact between the shallow angle taper portion 30*b* of the side surface of the rupture disc 30 and the supporting surface of the traveling sled 20 is the only functional contact between the traveling sled 20 and the rupture disc 30. Note that there is friction between the side surface of the rupture disc 30 and the supporting surface of the traveling sled 20, and such friction can depend on various factors such as the taper angle. In some implementations, a lubricant is disposed between the side surface portions 30*a* and 30*b* (but particularly tapered portion 30*b*) of the rupture disc 30 and the supporting surface areas of the traveling sled 20 to facilitate the sliding engagement between the rupture disc 30 and the traveling sled 20 that assists in allowing the rupture disc to be wedged into the supporting surface of the sled 20, and thus apply the radial compressive forces to the rupture disc 30. With such lubricant, the friction between rupture disc 30 and the traveling sled 20 can be reduced, and some amount of movement of the rupture disc 30 into the traveling sled 20 is permitted while pressure is applied to the top surface of the rupture disc 30. In some implementations, the lubricant includes a grease. However, other lubricants or other materials to permit such movement may be employed, for example, Teflon-based compounds or API pipe lubricant (Copper-Kote). Additionally, or alternatively, a surface finish quality of the side surface of the rupture disc 30 and the supporting surface of the traveling sled 20 can be increased to reduce the friction.

In some implementations, an annular seal 38 (e.g. 0-ring seal) is provided around an upper cylindrical (non-tapered) side edge portion 30*a* of the rupture disc 30 (See FIGS. 2 and 3). The annular seal 38 can help to prevent leakage between the traveling sled 20 and the rupture disc 30, and/or help to keep annular, upper cylindrical parallel sides of the rupture disc 30 away from parallel sides of the traveling sled 20 to prevent friction and premature breakage. In some implementations, to avoid the annular seal 38 from being released into the wellbore 92 when the rupture disc 30 breaks, the annular seal 38 is created by moulding a bonded rubber seal to the traveling sled 20, which may in some implementations, be bonded within a groove in travelling the sled 20. In some implementations, a preload applied to the rupture disc 30 and the traveling sled 20 during installation can create a seal between the rupture disc 30 and the traveling sled 20, thereby avoiding any need for the annular seal 38. In this manner, contact pressure between the rupture disc 30 and the traveling sled 20 can be sufficient to form a barrier without use of rubber seals.

In some implementations, a retainer ring 39 is fitted above the rupture disc 30 to secure the rupture disc 30 until it breaks. This retainer ring 39 does not need to be a seal and can be retained in the housing even after the glass breaks to avoid release of the retainer ring to the wellbore.

In the illustrated example of FIGS. 2 and 3, the travelling sled 20 is depicted in a first position relative to the housing 25 and 30. In some implementations, the disc failure activation mechanism may include a rupture disc/ring failure initiation mechanism that may be, for example, a shear ring 23 that secures the travelling sled to the housing 25 and 40 in the first position. In particular, the shear ring 23 resists the travelling sled 20 from sliding down relative to the outer casing towards the buoyant chamber 120 while a disc working pressure (which is below the disc failure trigger and disc rupture pressure as referenced above) or a range of such disc working pressures, is applied to the top surface of the rupture disc 30 from the fluid in the fluid-filled upper section 93. Thus, during the running in of a casing string 94 into the wellbore 92 (FIG. 1), the maximum disc working pressure developed on the top surface of the disc 30 will not exceed a disc failure trigger pressure that is required to activate the rupture disc failure mechanism (or the higher disc rupture pressure). When it is desired to trigger the disc failure mechanism, the disc working pressure is increased to at or above the disc failure trigger pressure. The shear ring 23 is configured to break by separating into two rings when the rupture disc 30 is subjected to a pressure at or above the disc failure trigger pressure (but below the disc rupture pressure), thereby initiating/activating the rupture disc failure mechanism—in this case by enabling movement downhole of the travelling sled 20. More specifically, subjecting the top surface of the rupture disc 30 to a disc working pressure that is at or exceeds the disc failure trigger pressure but smaller than the disc rupture pressure, causes the shear ring 23 to break thereby enabling the movement of the travelling sled 20. The disc failure trigger pressure can for example be between 2,500 to 8,500 psi, with any suitable increment, depending on configuration of the shear ring 23. Some implementations can enable the disc failure trigger pressure to be even greater, for example between 10,000 psi to 14,000 psi, or even greater than 14,000 psi, yet still remain below the disc rupture pressure.

Once the shear ring 23 has been broken, the travelling sled 20 starts moving further downhole from the first position towards a second position (not shown). The distance downhole that the sled 20 moves can be selected depending upon the specific operational parameters, but for example may be in the range of 1.0 to 2.0 inches. In the illustrated example, the second position is reached when the travelling sled 20 crashes/impacts into an impact surface such as shoulder portion 26 of the lower tubular member 25. With such impact, the travelling sled 20 with the rupture disc 30 and the fluid above the rupture disc 30 all experience sudden deceleration. With that sudden deceleration, a water hammer effect is induced on the top surface of the rupture disc 30, creating an extremely high force on the upper surface of the disc thereby causing the rupture disc 30 to fail and shatter. If a substantial portion of the body of the rupture disc 30 is under compression when the breaking force is applied, the disc will tend to shatter into small pieces/particles. Energy may be imparted by the breaking force/pressure evenly across the top surface of the rupture disc 30, including at the center, where the rupture disc 30 may be most fragile, allowing for a more reliable break. In other words, when hydraulic pressure on the top surface of the rupture disc 30 is increased and reaches the disc failure trigger pressure, the shear ring 23 fails thereby triggering/activating the rupture disc failure mechanism in which the travelling sled 20 begins to move. At the time that the shear ring 23 fails, the hydraulic pressure on the top surface of the rupture disc 30 has not reached the disc rupture pressure, which is greater than the disc failure trigger pressure. However, as described above, when the travelling sled 20 with the rupture disc 30 come to an abrupt stop, the water hammer effect from the fluid above the rupture disc 30 significantly increases hydraulic pressure acting on the top surface of the rupture disc 30 to reach or exceed the rupture pressure, thereby causing the rupture disc 30 to break and typically it will shatter into very small pieces of material. The disc failure trigger pressure is designed to be greater than the typical range of disc working pressure experienced during an operation such as running the casing string downhole, but smaller than the disc rupture pressure, and can provide for a reliable threshold at which the rupture disc failure mechanism is activated. Note that in some implementations rupturing of the rupture disc 30 with hydraulic pressure alone (i.e. without use of the travelling sled or another type of separate rupture disc failure/activation mechanism) is possible, but the rupture pressure when exposed to only hydraulic pressure on the upper surface is relatively high, and the rupturing of the disc within a pre-determined pressure range may not be as reliable as using a rupture disc failure activation mechanism, and in some implementations may not be feasible.

The shear ring 23 is an example of a securing mechanism for the travelling sled 20 and also part of a disc failure activation mechanism. The shear ring 23 is designed to release the travelling sled 20 before the rupture disc 30 experiences a pressure that would be undesirable to an operator. However, other securing mechanisms for achieving this purpose are possible. For example, the travelling sled 20 can instead be held by shear pins. Alternatively, the travelling sled 20 may be held by a shearable device or other mechanism such as a collet for example. Also, the structure of the shear ring 23 facilitates the restoration of casing internal diameter because there are no or few portions of the shear ring 23 left extending into the casing internal diameter, as may be the case when shear pins are used.

In some implementations, the travelling sled 20 has a void 32 around an outside surface of the travelling sled 20 in a vicinity of the rupture disc 30 that may reduce or eliminate friction. The void 32 may also permit the sled to undergo some level of flexing/deformation/strain when the disc 30 is subjected to hydraulic pressure, which may assist in allowing compression to develop in the disc, particularly in the region of the disc where the tapered surfaces are located. In addition, the void 32 can provide a fluid path through which external pressure via fluid above the rupture disc assembly 10 can be applied to a top portion of the travelling sled 20, which can further increase the radial compression on the rupture disc 30.

In some implementations, the travelling sled 20 has circumferentially spaced ports 21 to allow fluid from the annulus around the travelling sled 20 (where a lower portion of the shear ring 23 will be retained) to discharge fluid to the wellbore 92 as the travelling sled 20 moves to the second position. Other implementations are possible, such as slots or castellations, etc.

In some implementations, a lock ring 27 engages with a corresponding groove 28 in the travelling sled 20 upon the travelling sled 20 reaching the second position, thereby locking the travelling sled 20 in the second position. However, other locking mechanisms are possible. In other implementations, no such mechanism is provided to lock the travelling sled 20 in the second position.

It is to be understood that the mounting apparatus 20, 25 and 40 is very specific and that other mounting apparatuses for supporting the rupture disc 30 are possible. For example, as described later, other implementations are possible without any travelling sled at all. More generally, any suitable mounting apparatus that has a supporting surface that is complementary to the side surface of the rupture disc 30 to enable engagement between the rupture disc 30 and the mounting apparatus can be employed, such that radial compression of the rupture disc 30 is made possible.

In some implementations, the upper tubular member 40 is coupled to the lower tubular member 25 in such a way that an outer wall of lower tubular member 25 overlaps at least a portion of an inner wall of the upper tubular member 40. In some implementations, the upper tubular member 40 and the lower tubular member 25 are mechanically joined together, for example using a threaded connection. Various other interconnecting means that would be known to a person skilled in the art are possible. A fluid seal between upper tubular member 40 and the lower tubular member 25 can be provided by one or more seals. In the illustrated example, the fluid seal is created by an 0-ring seal 22.

Although not shown in the illustrated example, the upper tubular member 40 can be threaded for connection to other tubular members of the casing string 94 for the fluid-filled upper section 93, and the lower tubular member 25 can also be threaded for connection to other tubular members of the casing string 94 for the buoyant chamber 120. The upper tubular member 40 and the lower tubular member 25 can be configured to have a similar internal diameter as the other tubular members of the casing string 94. It is noted that the tubulars members can be connected to the casing string 94 using various means of connection.

In the illustrated example, the diameter of the rupture disc 30 can be 4.8 inches for example, and the internal diameter of the upper tubular member 40 and the lower tubular member 25 can be 4.5 inches for example. In this way, the rupture disc 30 is installed within a radially expanded region of the casing string 94. However, other dimensions of both the rupture disc 30 and the tubular members 25 and 40 are possible, provided that the rupture disc 30 can seal the lower tubular member 25 and be ruptured upon being subjected to the rupture force/pressure.

The amount of radial compression in the rupture disc that is achieved during loading may be the most, or may be at least an important factor to increasing a burst rating of the rupture disc 30 or reducing the thickness of the rupture disc 30 for the same burst rating. While the shallow angle taper of the rupture disc 30 is important in this regard, other factors are at play as well. The thickness and diameter of the rupture disc 30, combined with the shallow angle taper and the wall thickness of the travelling sled 20 and a coefficient of friction between the rupture disc 30 and travelling sled 20 are all cooperative factors in achieving the radial compression, and may need to be considered together with a desired shear threshold for a particular application (well depth, length, and reservoir pressure). Geometry of the rupture disc 30 is also a factor. An example thickness of the rupture disc 30 is 1", but other implementations are possible, for example, between about 0.75" to 2.5". Another possible range for the thickness is from ⅜" to 1⅜" to cover a full pressure range of 2,500 to 14,000 psi for various wellbore sizes. In implementations, the rupture disc assembly 10 can be configured such that the disc failure trigger pressure is anywhere in the range of 2,500 to 14,000 psi.

Figure 4:
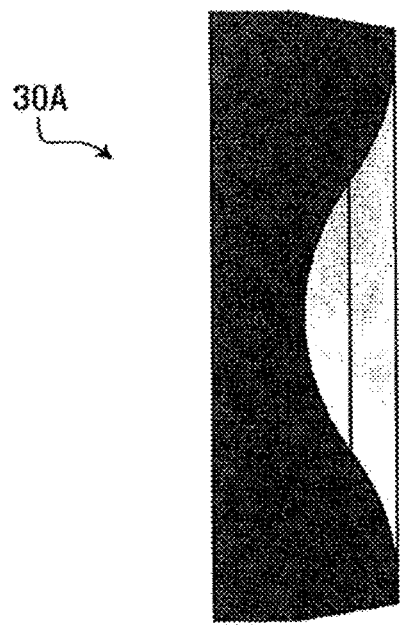
FIGS. 4 through 6 are schematics of another rupture disc in which a bottom surface is a concave surface.
Figure 5:
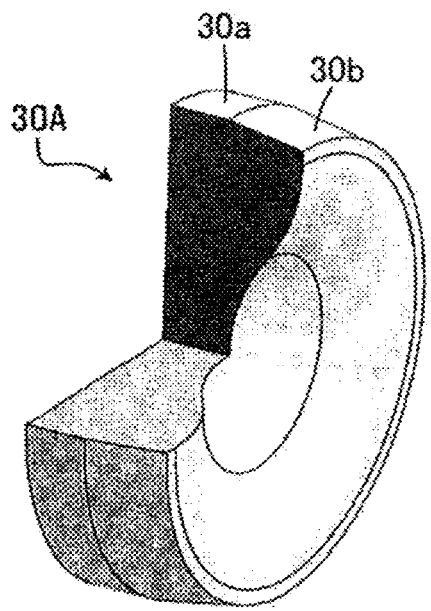
Figure 6:
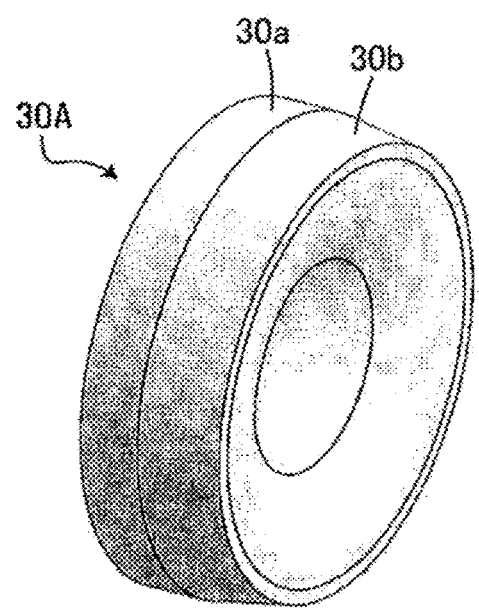

In the illustrated example, the rupture disc 30 is shown to have a specific geometry. As indicated above, the specific geometry includes a truncated cone shape for a bottom portion 30b and a cylindrical shape for a top portion 30a. Notably, there is no taper with the cylindrical shape, but the conical shape provides for the shallow angle taper described above. However, it is to be understood that other geometries are possible for a rupture disc. In general, geometries that enable radial compression on the bottom surface can be employed. Note that this can include shapes in which voids or cut-outs are present. While the illustrated example shows the bottom surface of the rupture disc 30 to be flat, it has been determined through modeling that other shapes may further improve the radial compression on the bottom surface or bottom region of the disc. For example, with reference to FIGS. 4 through 6, shown are schematics of another rupture disc 30A in which a bottom surface is a concave surface. The concave surface is an example in which a void or cut-out is present. It has been determined through modeling that this concave surface can further increase radial compressive stress in the rupture disc 30A, particularly in its lower region. The compressive stress in the rupture disc 30A is increased by volume reduction compared to the rupture disc 30 without the concave surface. The rupture disc 30A with the concave surface can also reduce the amount of debris released to the wellbore 92, which may become important on larger sized airlocks with large disc thickness and diameter.

Composition of Rupture Disc and Sled

In implementations, rupture disc 30 may be composed of any suitable material that has relatively high compressive strength and can shatter, ideally into small pieces. In some implementations, the rupture disc 30 includes glass. In general, glass has a characteristic of being very strong when subjected to compressive forces, but much weaker when subjected to tensile stresses. In some implementations, the glass is tempered glass, for example soda lime glass. When tempered, the surface regions of the glass are formed and held in compression, but the interior regions are placed into tension.

When using tempered glass, it can enable the rupture disc 30 to shatter into very small pieces, perhaps even sand and dust type particles. In this way, it is possible to reduce the size of the debris caused by the rupture disc 30 being shattered. Based on testing, it has been observed that with higher shifting pressure, smaller particle sizes can result. Because the debris is small, there is little danger to the casing string 94 from ruptured pieces, and the potential for clogging is low or minimal. While all of the following described materials may be suitable for use in a rupture disc 30 it will be appreciated that some materials may have more beneficial properties than others.

In some implementations, the rupture disc 30 includes a "ceramic". Ceramics are inorganic, non-metallic solids comprising either metal or non-metal compounds. This encompasses a wide range of materials that can be crystalline, semi-crystalline and amorphous solids that are typically strong in compression but display low ductility. Traditional clay-based ceramics include porcelain, brick and earthenware. Advanced ceramics are generally not clay based but typically comprise an oxide, such as alumina ($Al_2O_3$) or zirconia ($ZrO_2$) or a non-oxide, such as boron carbide ($B_4C$) or silicon carbide (SIC).

Glass is considered to be a non-crystalline (amorphous) ceramic, typically formed cooling of the molten form. The structure of glass typically lacks the long-range order seen in crystalline materials. Although silica-free glasses do exist, the majority of glasses are comprised of silica (silicon dioxide) with other substances (fluxes) added to make the glass easier to work with and alter physical properties. Glass is chemically resistant, brittle and typically transparent.

Glass-ceramics are formed in the same way as a glass, followed by an additional manufacturing step comprising reheating, causing partial crystallisation yielding a material with high-temperature stability, low thermal expansion, high strength and toughness. An example of a glass-ceramic is a blend of lithium oxide ($Li_2O$), alumina ($Al_2O_3$) and silica ($SiO_2$). Known applications for glass-ceramics include cooktops and cookware.

As noted above, rupture disc 30 may be made from tempered glass, which is a type of glass that has undergone a thermal or chemical treatment to increase its strength. During thermal treatment, the glass is heated above its transition temperature, followed by rapid air cooling. This yields a material with increased strength where the outer surface is in compression, whilst the interior is in tension. However, while generally stronger than un-tempered glass, when tempered glass is broken, tempered glass breaks into small granular chunks-possibly even into powder-like form, rather than dangerous large shards. This is because once the surface area that is in compression fails, that failure also releases the tension in the interior region of the object (such as in a rupture disc 30) which causes the failure to rapidly propagate throughout the body of the body, causing it to break into very small pieces. Glass can be fully tempered, creating tempered glass that is approximately four to five times as strong as un-tempered glass.

Due to its lower coefficient of expansion, borosilicate glass cannot be tempered but can be heat strengthened. Heat strengthening is a similar process to tempering, except using a slower cooling process. The resulting heat-strengthened glass is approximately two times as strong as untreated glass.

Tempered glass is a desirable choice of material for rupture disc 30, primarily to ensure that the rupture disc 30 can break into very small pieces. Also, a surface compression created by a tempering process complements the radial compression supplied by the tapering effect. When tempered glass is utilized in a rupture disc 30 with a tapered side surface, as described above, the hydraulic loading on the upper surface would tend to create tension in the lower region of the rupture disc 30. This tension might otherwise, in the absence of the tapering, overcome the surface compression created by the tempering process at the lower surface of the rupture disc 30. However, the tapering effect can create radial compressive forces, that may result in the entire lower region being in compression, counteracting the tensile stresses created when subject to hydraulic loading, thus increasing its overall burst capacity. On the upper surface of rupture disc 30, however, the compression forces created by the tempering will be supplemented by the compression created by the hydraulic loading. The total compression forces, however, at the upper surface, can be controlled such that there will not be a compressive failure at the surface during hydraulic loading as described above. It is also noted that tempered glass is less susceptible to micro-defects such as minor cracks or scratches in the outer surface. Sled 20 may be made from any suitably strong material which is also able to withstand downhole conditions, such as by way of example 4140/4130 AISI steel.

Example Results of Shallow Angle Taper

A difficulty of using a glass or ceramic material is that a disc-shaped geometry can be prone to tensile stress on the bottom surface 30c when force is applied to the top surface. Ceramics and glass are prone to unpredictable failure, even at low amounts of tensile stress. However, by using a shallow angle taper, radial compression can significantly mitigate or eliminate the tensile stress. The effects of using a shallow angle taper are explored with simulations using Finite Element Analysis, for implementations using tempered soda lime glass for rupture discs. Each simulation involves axisymmetric analysis with a 2D representation instead of a 3D representation, and do not take into consideration any effect of prestress from tempering. The results of the simulations are described below with reference to FIGS. 8 to 12.

Figure 8:
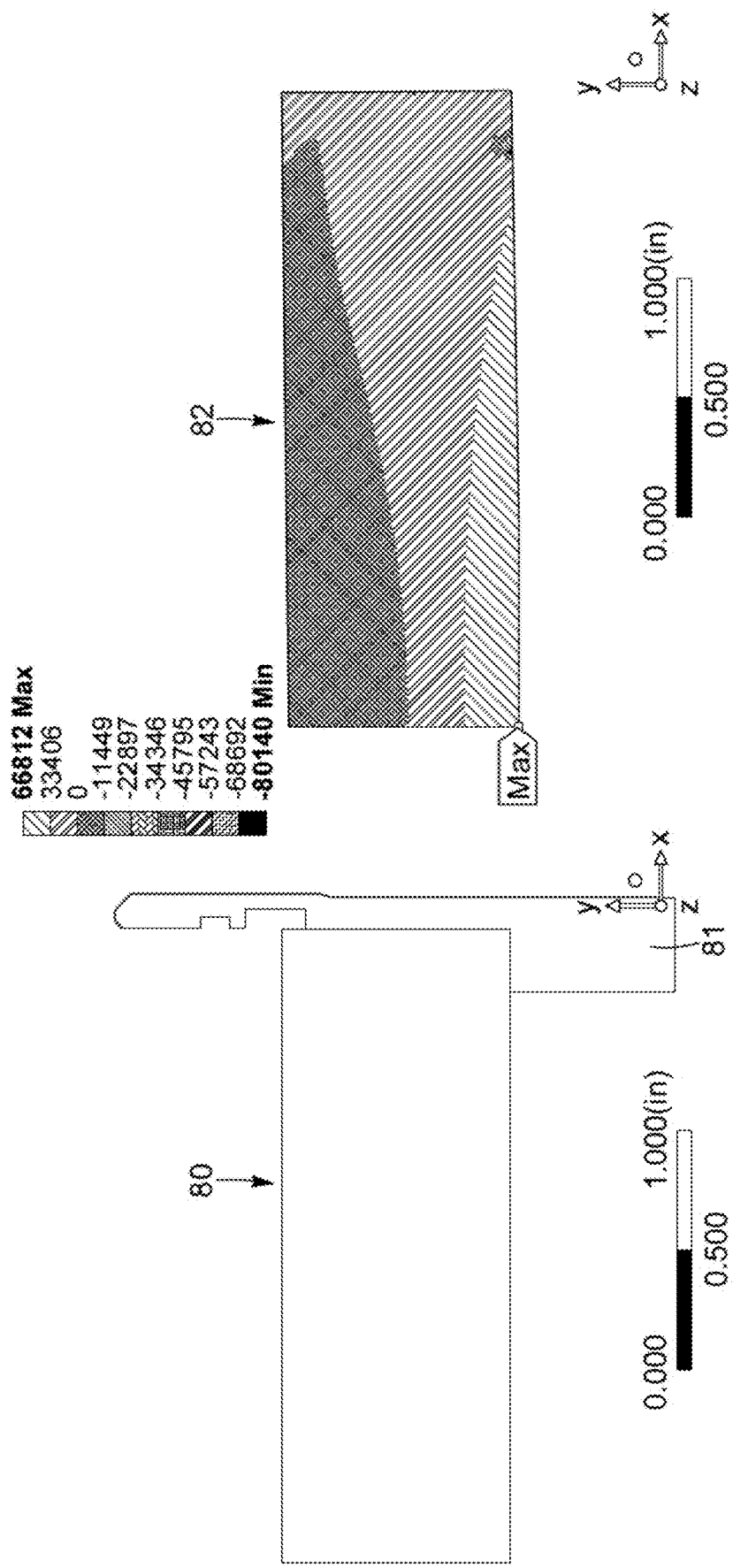
FIG. 8 is a cross-sectional schematic of a rupture disc that has no taper and resulting stress when subjected to a load.

Referring first to FIG. 8, shown is a cross-sectional schematic of a rupture disc 80 that has no taper and resulting stress 82 when subjected to a load. The rupture disc 80 is supported by a housing 81 that surrounds the rupture disc 80, but only the right side of a cross-section of the rupture disc 80 and the housing 81 is shown. The load is 10 ksi, which is applied on top of the rupture disc 80. Notably, the resulting stress 82 includes first principal tensile stress in a lower region in an amount of up to 66812 psi. This is a poor result that can be attributed to the fact that there is no taper.

Figure 9:
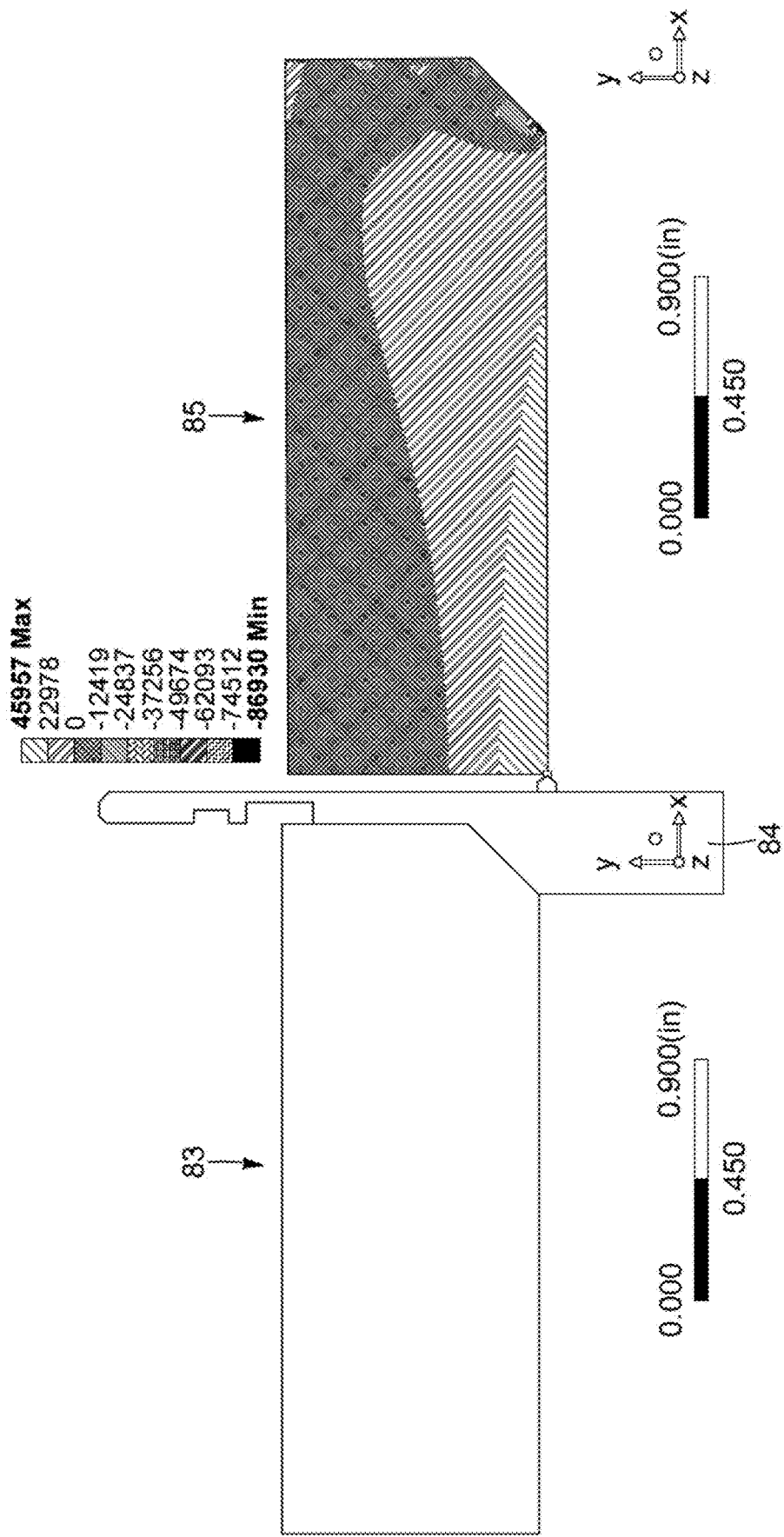
FIG. 9 is a cross-sectional schematic of a rupture disc that has a larger angle taper and resulting stress when subjected to a load.

Referring now to FIG. 9, shown is a cross-sectional schematic of a rupture disc 83 that has a large angle taper and resulting stress 85 when subjected to a load. The rupture disc 83 is supported by a housing 84 that surrounds the rupture disc 83, but only the right side of a cross-section of the rupture disc 83 and the housing 84 is shown. The load is 10 ksi, which is applied on top of the rupture disc 83. The larger angle taper is 45 degrees. Notably, the resulting stress 85 includes first principal tensile stress in a lower region in an amount of up to 45957 psi. While this is an improvement from having no taper as in FIG. 8, it is still a relatively poor result that can be attributed to the fact that the taper angle of 45 degrees is too large.

Figure 10:
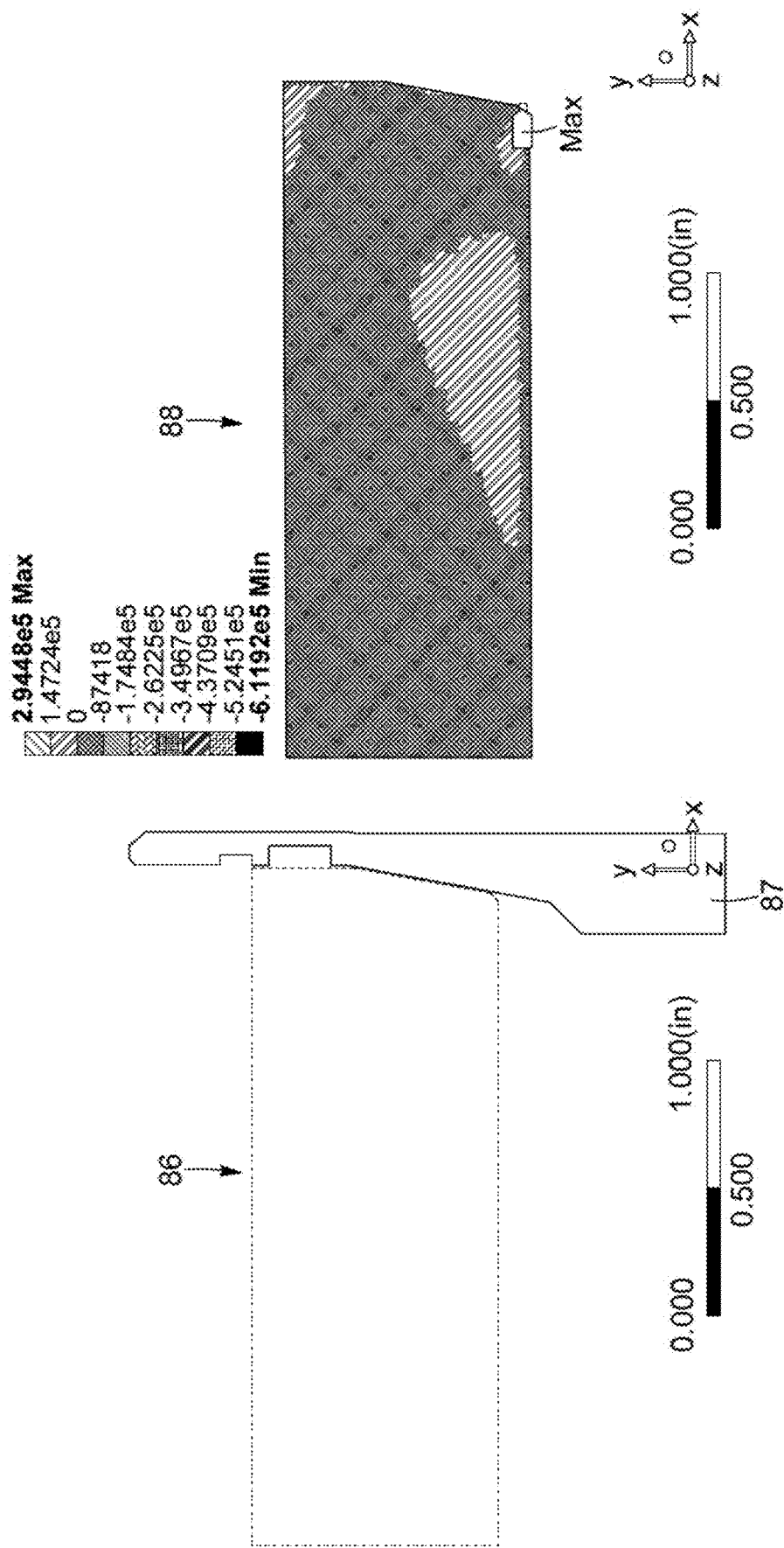
FIG. 10 is a cross-sectional schematic of a rupture disc that has a shallow angle taper and resulting stress when subjected to a load.

Referring now to FIG. 10, shown is a cross-sectional schematic of a rupture disc 86 that has a shallow angle taper and resulting stress 88 when subjected to a load. The rupture disc 86 is supported by a housing 87 that surrounds the rupture disc 86, but only the right side of a cross-section of the rupture disc 86 and the housing 87 is shown. The load is 10 ksi, which is applied on top of the rupture disc 86. The shallow angle taper is 10 degrees. Notably, the resulting stress 88 in a lower region includes very little first principal tensile stress compared to having no taper (FIG. 8) and a larger angle taper (FIG. 9).

Figure 11:
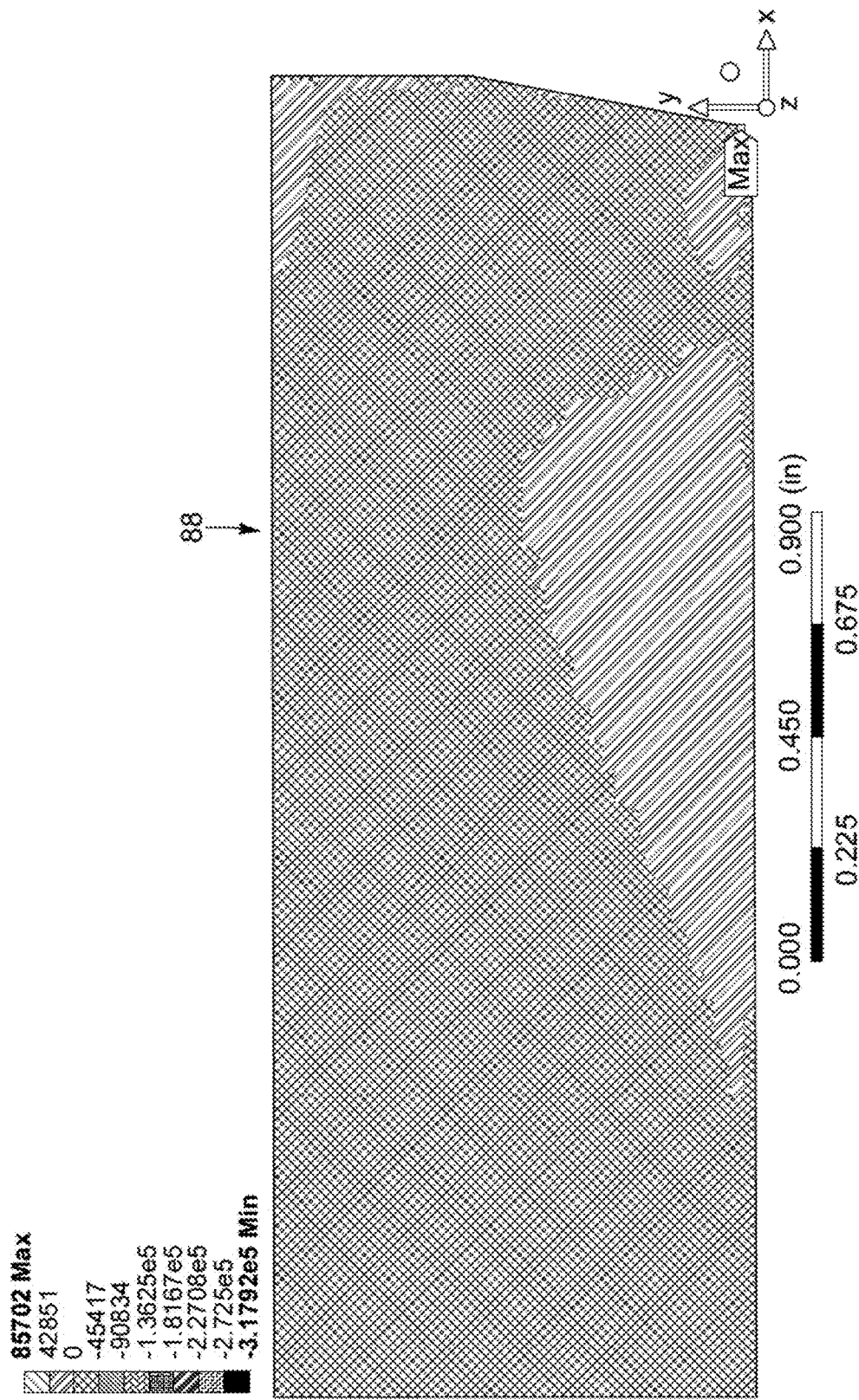
FIG. 11 is an enlarged view of the resulting stress shown in FIG. 10.

Referring now to FIG. 11, shown is an enlarged view of the resulting stress 88 shown in FIG. 10. Again, the resulting stress 88 in a lower region includes very little tensile stress compared to having no taper (FIG. 8) and a larger angle taper (FIG. 9). An average first principle stress is −9,903 psi, which indicates compression (i.e. there is no average tensile stress). This is a significant improvement over having no taper (FIG. 8) and a larger angle taper (FIG. 9) because tensile stress is significantly mitigated or cancelled due to the shallow angle taper.

Figure 12:
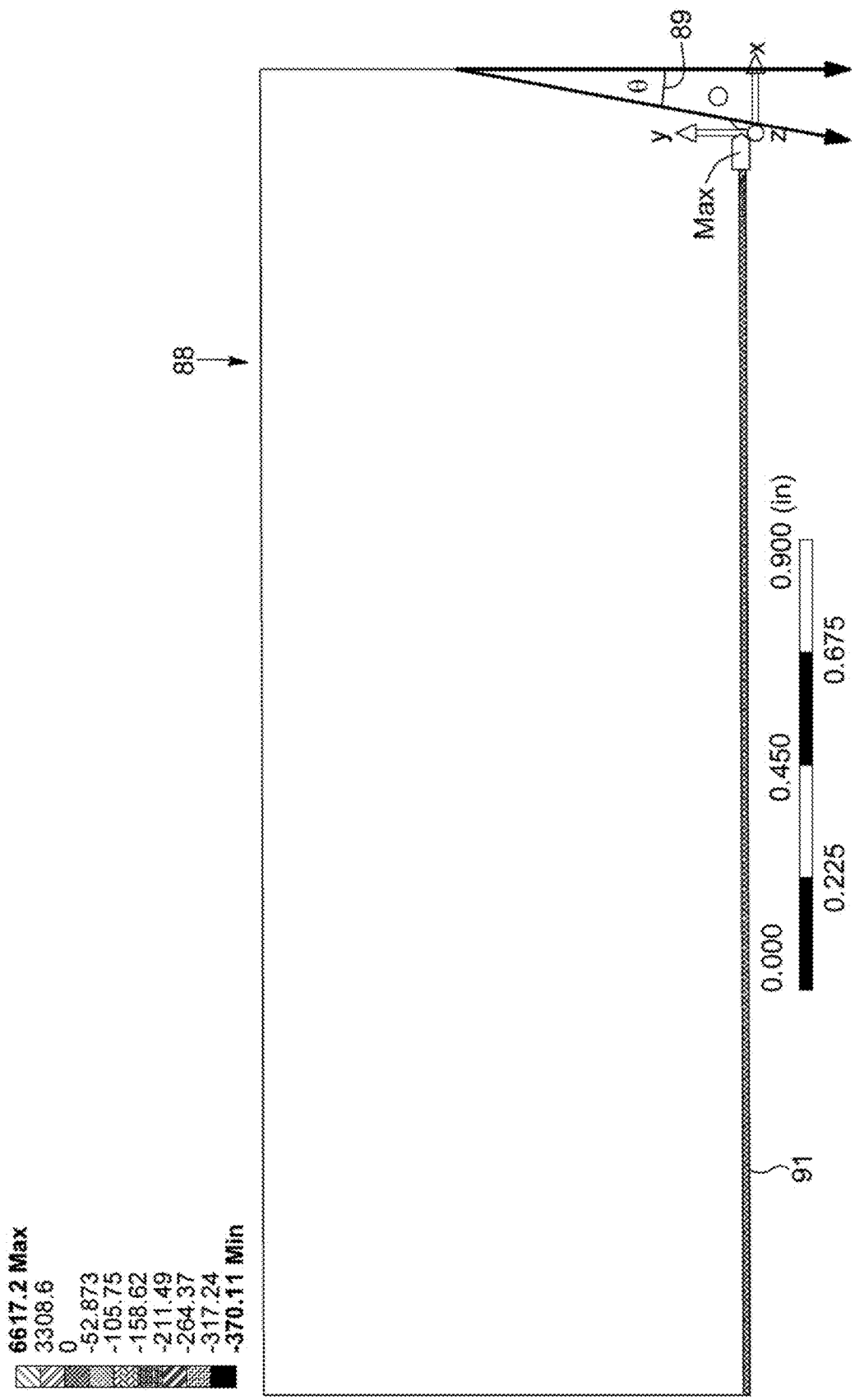
FIG. 12 is an enlarged view of the resulting stress on a bottom surface of the rupture disc shown in FIG. 10.

Referring now to FIG. 12, shown is an enlarged view of the resulting stress on a bottom surface 91 of the rupture disc 86 shown in FIG. 10. The average first principle stress on the bottom surface 91 is −9,903 psi, which indicates compression (i.e. there is no average tensile stress on the bottom surface). Again, this is a significant improvement over having no taper (FIG. 8) and a larger angle taper (FIG. 9) because tensile stress is significantly mitigated or cancelled due to the shallow angle taper.

Based on the foregoing, it is clear that an angle 89 (FIG. 12) of taper of a rupture disc 88 has a significant impact on resulting stresses in the rupture disc 88 when subjected to a load. Based on further simulations using Finite Element Analysis, the following table of values has been produced to demonstrate a relationship between the resulting stress on a bottom surface 91 of a rupture disc 88 vs a taper angle 89 (FIG. 12) of the rupture disc 88 in the case of tempered soda lime glass.

TABLE 1 effects of taper angle on axial displacement and resulting stress

| Angle (degrees) | Glass Axial Displacement (in) | Maximum First Principal (psi) | Average First Principal (psi) |
|---|---|---|---|
| 5 | 0.49 | 6804.96 | −157.80 |
| 10 | 0.17 | 18696.66 | −171.977 |
| 20 | 0.04 | 36791.4 | 6712.938 |
| 30 | 0.016 | 56210.18 | 16629.49 |
| 40 | 0.007 | 50294.53 | 20288.91 |
| 45 | 0.005 | 31833.36 | 17189.33 |

Figure 13:
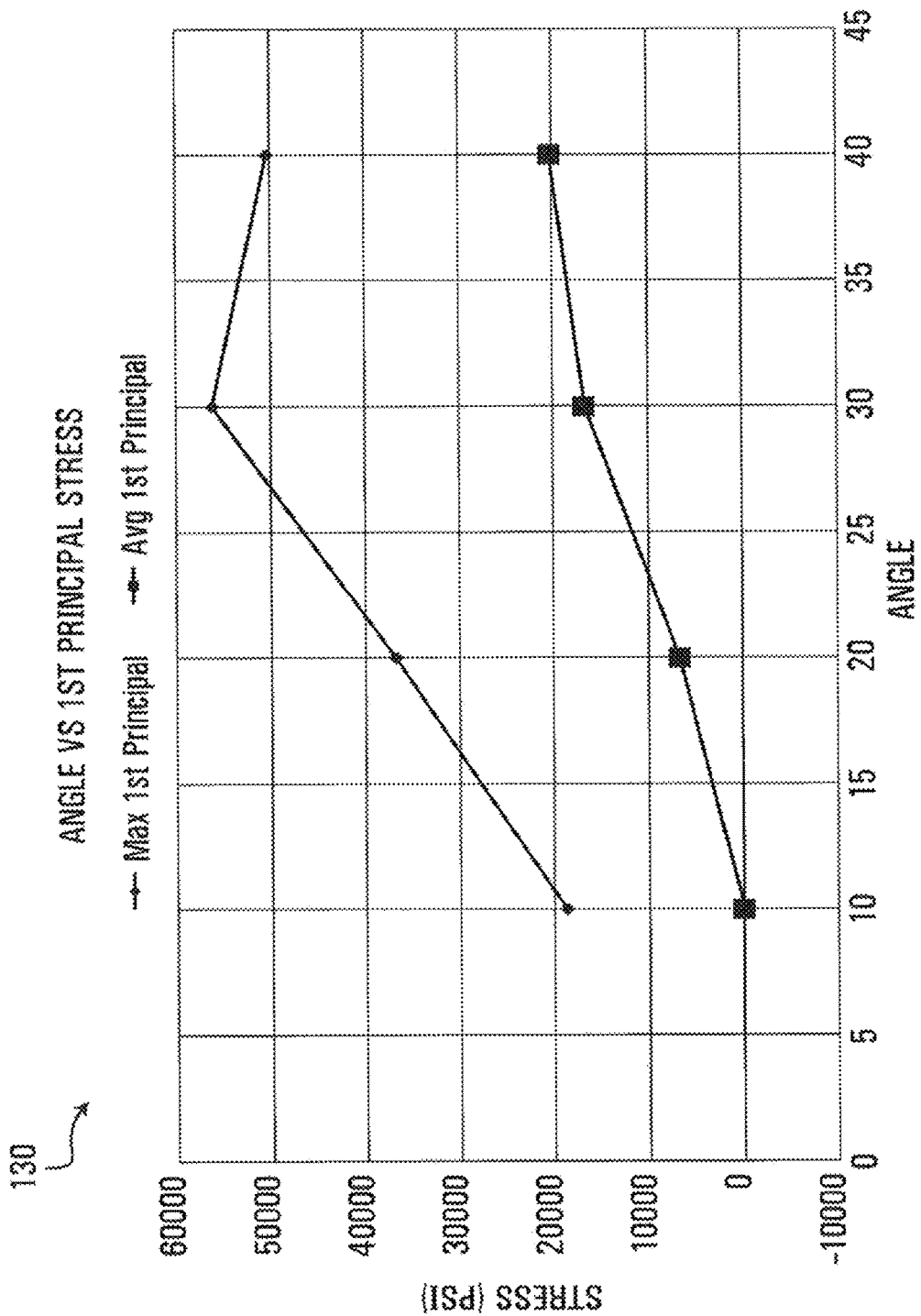
FIG. 13 is a graph showing a relationship between the resulting stress on a bottom surface of a rupture disc vs a taper of the rupture disc.

Table 1 includes both maximum and average values for the first principle stress along the bottom surface 91 of the rupture disc 88 when the rupture disc 88 is subjected to a load of 10 ksi on top of the rupture disc 88. With reference to FIG. 13, shown is a graph 130 in which the values in Table 1 have been plotted. The graph shows how the taper angle 89 being 5 degrees provides for an average stress of almost zero (−157.80 psi per Table 1) and a relatively low maximum stress (6804.96 psi per Table 1). However, when the taper angle 89 is increased, the resulting stress in the rupture disc 88 increases. The lowest operative angle would be one that causes such significant deformation in the travelling sled that a large amount of friction is induced, or that the radial compression exceeds the bearing strength of the glass. The friction coefficient would be a driving factor. In some implementations, the lowest operative angle for the taper angle 89 is 3 degrees (not shown).

Table 1 also includes values for the axial displacement of the rupture disc 88 relative to the sled 20 under the above described conditions. As the taper angle 89 decreases, the resulting axial displacement of the rupture disc 88 increases (i.e. the rupture disc 88 is able to be pushed into the travelling sled 20). If the axial displacement of the rupture disc 88 is too large, it is possible that the rupture disc 88 will become displaced from the supporting surface of travelling sled 20 and fall out of position. While reducing the taper angle 89 down to 5 degrees results in very low average and maximum stress in the rupture disc 88, the axial displacement becomes relatively large. It may be desirable to select the taper angle 89 to reduce or minimise the first principle stress along the bottom surface of the rupture disc 88 without generating an excessive amount of axial displacement. As noted above, in specific implementations, the taper angle 89 is set to approximately 10 degrees, which can offer a suitable balance of reduced first principle stress along the bottom surface of the rupture disc 88 and acceptable axial displacement of the rupture disc 88 relative to the sled 20.

By enhancing or optimizing compression of the rupture disc 88 during loading, prior to actuation of the shear mechanism, it is possible to achieve a high burst rating, for example 14,000 psi or higher for a thickness of about 1" for the rupture disc 88. Conversely, the rupture disc 88 can be designed to have reduced thickness while still achieving adequate burst rating. Advantageously, by reducing the thickness for the rupture disc 88, the amount and size of the debris after the rupture disc 88 has been shattered can be reduced. Also, the material cost of the rupture disc 88 can be reduced.

Figure 7:
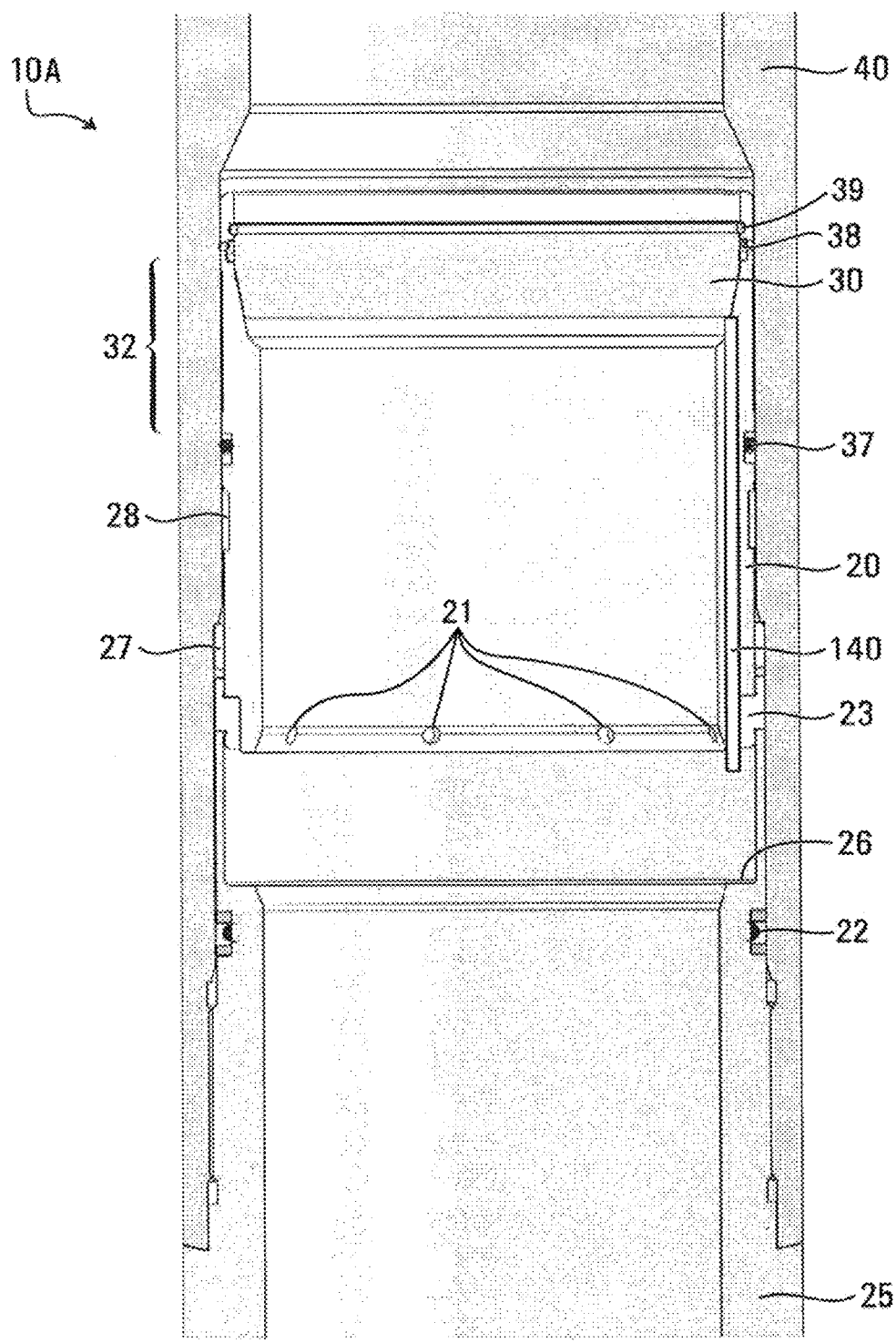
FIG. 7 is a cross-sectional drawing of another rupture disc assembly in which a pin is used to help facilitate rupturing of a rupture disc.

Referring now to FIG. 7, shown is a cross sectional drawing of another rupture disc assembly 10A in which a pin 140 is used to help facilitate rupturing of the rupture disc 30. The rupture disc assembly 10A of FIG. 13 is substantially the same as the rupture disc assembly 10 of FIGS. 2 and 3, except for addition of the pin 140. The pin 140 is held within the sleeve and extends through the travelling sled 20 and extends from the bottom towards the shoulder 26. During operation, when the travelling sled 20 travels towards and collides with the shoulder 26, the pin is driven into the rupture disc 30 to help facilitate fracturing of the rupture disc 30. However, testing has suggested that the pin 140 may not meaningfully improve the fracturing of the rupture disc 30. Therefore, some implementations, such as those described above with reference to FIGS. 2 and 3, omit such pin.

Figure 14:
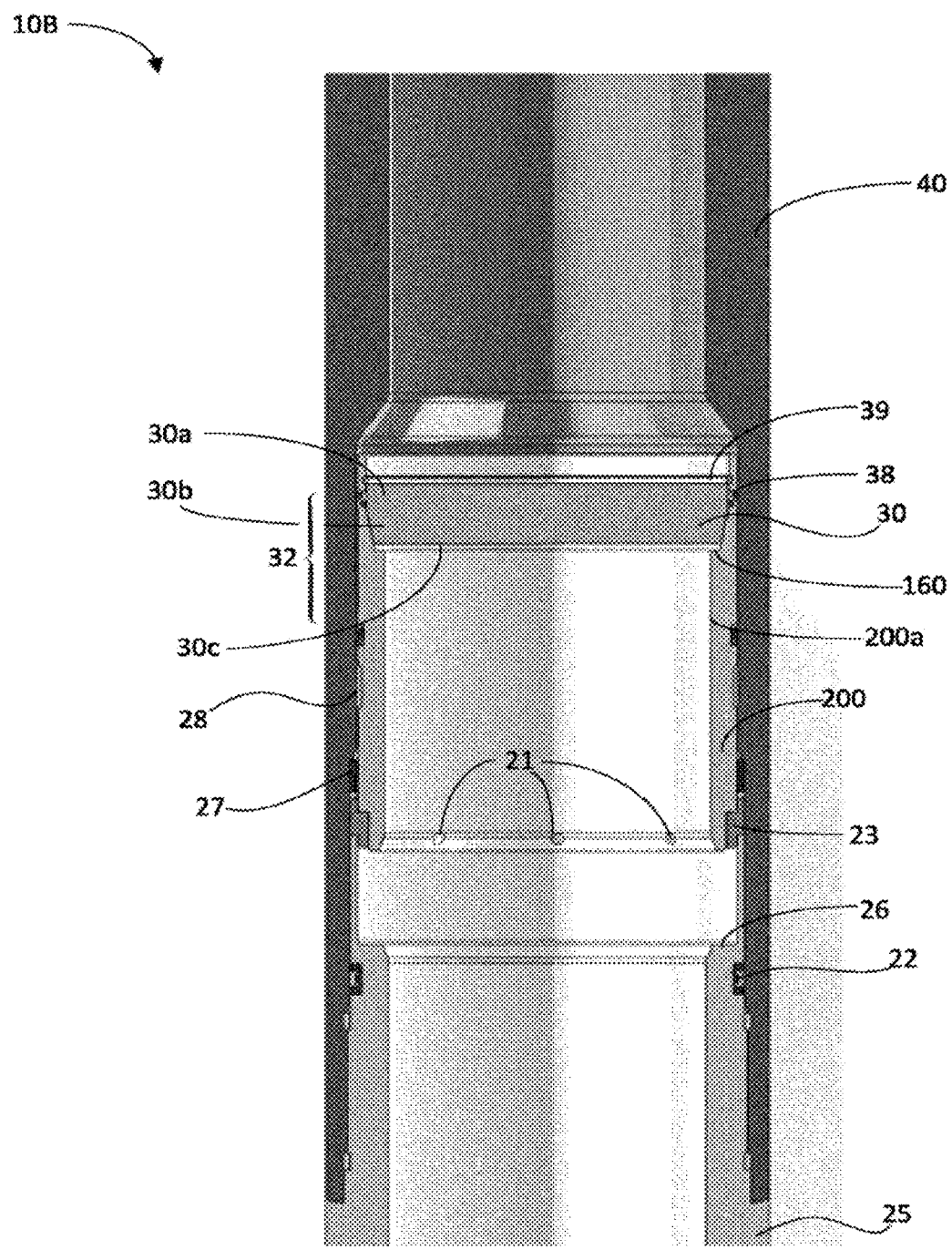
FIG. 14 is a cross-sectional drawing of another rupture disc assembly with the rupture disc in a first position.
Figure 15:
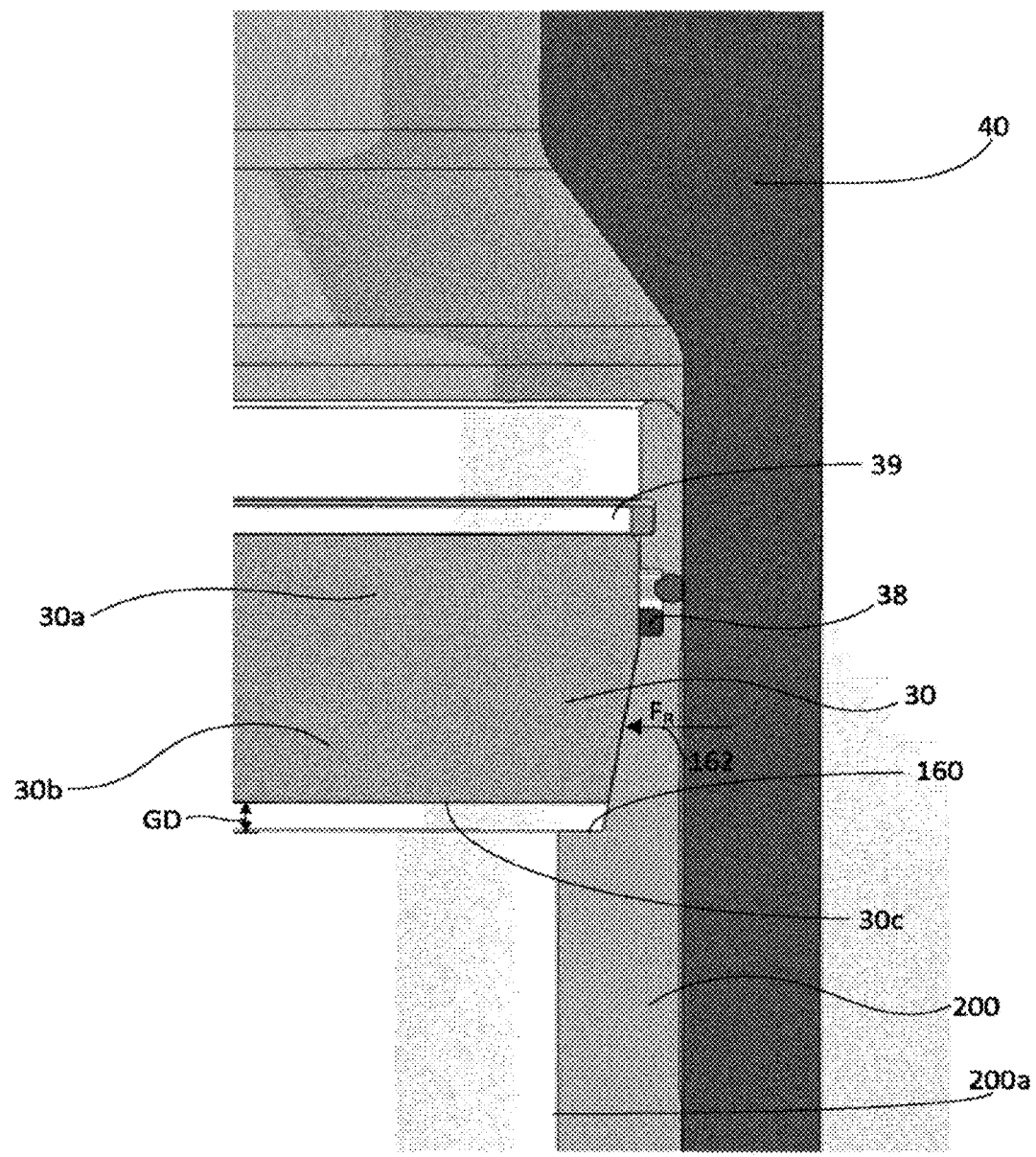
FIG. 15 is an enlarged view if the rupture disc assembly of FIG. 14.

Referring now to FIG. 14, shown is a cross sectional drawing of another rupture disc assembly 10B, which includes a travelling sled 200 with an interior located, axial abutment feature, such as a stop shoulder 160. The rupture disc assembly 10B of FIG. 14 is substantially the same as the rupture disc assembly 10 of FIGS. 2 and 3, but with the additional feature of stop shoulder 160. In the illustrated example, the travelling sled 200 has a supporting generally conical surface that is complementary to, and mates with the shallow angle taper portion 30b of the truncated conical outer, side surface of the rupture disc 30, similar to as described above for travelling sled 20. The tapered portion of the supporting surface of travelling sled 200 tapers inwards in the downhole direction and terminates at stop shoulder 160. gStop shoulder 160, shown in more detail in FIG. 15, provides an abutment that extends radially inwards, in some embodiments extending generally perpendicular to the inner cylindrical surface 200a of travelling sled 200, and may be formed as an integral part of sled 200. Cylindrical interior surface area 200a provides a pathway for fluid to flow therethrough. The stop shoulder 160 comprises a contact surface area that may be generally perpendicular to said interior surface of said mounting apparatus and the contact surface area is operable to engage with the bottom surface of said rupture disc 30 at a circumferential edge region. Stop shoulder 160 may be, as shown, located at the lower terminus of the shallow tapered supporting surface area of said mounting apparatus. The contact surface area/shoulder may be selected to be wide enough to provide support for the rupture disc at the bottom surface without causing forces on the bottom surface that result in shattering of the rupture disc during axial displacement. The contact surface area/shoulder may not be too wide so as to drastically impact flow of fluid through sled 200.

FIG. 14 illustrates a typical first starting position of rupture disc 30 in travelling sled 200, such as before rupture disc assembly 10B is installed in a casing string such as casing string 94 in FIG. 1. In the illustrated example, shown in more detail in FIG. 15, the distance GD is the gap between the bottom surface 30c of rupture disc 30 and the upward facing surface of stop shoulder 160. For a rupture disc 30 with by way of example only, a diameter of 5.3 inches, a contact surface width of 0.146 inches, and a total thickness of 0.961 inches, in which 58.5 percent of that thickness is tapered, and a taper angle of 10 degrees, the distance GD may be 0.1 inches. These dimensions of the rupture disc and the taper angle are inter-related to each other and so a modification in one dimension and/or the taper angle can be made in conjunction with modifications in the other dimensions.

Stop shoulder 160 permits for a certain amount of axial displacement of rupture disc 30 but may effectively restrict the maximum amount of displacement to 0.1 inches. The result is a very predictable amount of radial compression in the glass or other material forming rupture disc 30, regardless of temperature changes, or pressure induced load to the glass. The 0.1 inches gap was determined semi-empirically, since it is the theoretical axial displacement of the rupture disc 30 at a disc working pressure of 2000 psi. The 2000 psi pressure was chosen as it was believed it would avoid temperature induced failures of rupture disc 30.

In other embodiments the distance GD may vary with the diameter, thickness and taper angle of rupture disc 30, anticipated applied hydraulic pressures and coefficient of friction between the side surface of the rupture disc 30 and the supporting surface of the traveling sled 200, and GD may for example be between 0.025 and 0.5 inches.

When the rupture disc assembly 10B is placed downhole, the rupture disc assembly 10B may be exposed to a rapid increase in ambient temperature. The increase in temperature may be applied from exterior of the rupture disc assembly and thus impact upon sled 200 before impacting upon rupture disc 30. The different materials used in the construction of rupture disc assembly 10B may possess differing thermal properties, some components of rupture disc assembly 10B may thermally expand at a different rate, and/or by a different amount. For example, sled 200, which may be made from 4140/4130 AISI steel, may be subjected to heat from outside of the sled, and may thermally expand at a faster rate/greater extent (at least initially) than rupture disc 30, which may be made from glass and is located within sled 200. The relative differences in expansion may temporarily increase the clearance between the supporting surface of sled 200 and shallow angle taper portion 30b of the side surface of the rupture disc 30. This increased clearance, in combination with the disc working pressure applied to the top surface of the rupture disc may result in axial displacement of disc 30, which may be more extensive, than if the sled and the rupture disc expanded at the same rate/same extent.

Due to the differences in rate and magnitude of thermal expansion and thermal conductivity described above, sled 200 may have substantially stopped expanding whilst rupture disc 30 then continues to expand. As rupture disk 30 expands, this may result in the tapered wall surface of the disc support mechanism exerting increased radial compression on the shallow angle taper portion 30b of the side surface of the rupture disc 30. The radial compression force ($F_R$) is indicated by arrow 162 in FIG. 15. The magnitude of this radial compression also increases with increasing axial displacement of rupture disc 30 due to the complementary tapered surfaces of sled 200 and disc 30. If the radial compression exceeds the bearing strength of the glass, rupture disc 30 will burst/break.

Furthermore, increased axial displacement of rupture disc 30 (and especially in conjunction with the thermal effects associated with increasing temperatures when being placed downhole) may also result in a shift in orientation of rupture disc 30 within travelling sled 200 such that rupture disc 30 is no longer aligned perpendicular to the downhole direction. This may result in a point load forming on a portion of the surface of rupture disc 30 that is in contact with travelling sled 200, which may cause undesired bursting/breaking of rupture disc 30.

As described above, the tapered portion of the supporting surface of travelling sled 200 tapers inwards in the downhole direction and the wall thickness associated with the tapered wall surface becomes thicker and therefore stiffer in the downhole direction. As such, increasing axial displacement of rupture disc 30 downwards may result in the tapered portion 30b coming into contact with a stiffer portion of the supporting surface of travelling sled 200 (when the slower expanding rupture disc contacts the inner tapered surface of the sled) and thus the sled wall may be able to exert a relatively larger radial compression force upon rupture disc 30.

The use of stop shoulder 160 can help address reliability/repeatability problems of the apparatus that arise downhole due to significant increases of temperature being imparted onto the rupture disc assembly, including problems associated with differing rates of thermal expansion of the disc mounting apparatus and the rupture disc materials.

In assemblies where the taper angle is very shallow, the stop shoulder may also function to prevent the rupture disc from simply being pushed through the sled by the applied hydraulic pressure. The tendency of this to occur may in the absence of the stop shoulder, be enhanced by the aforementioned thermal effects.

With the shoulder stop present, the rupture disc apparatus is more likely to function in a manner where the rupture disc assembly will function so that it only fails in accordance with the disc failure activation mechanism as described above.

Figure 16:
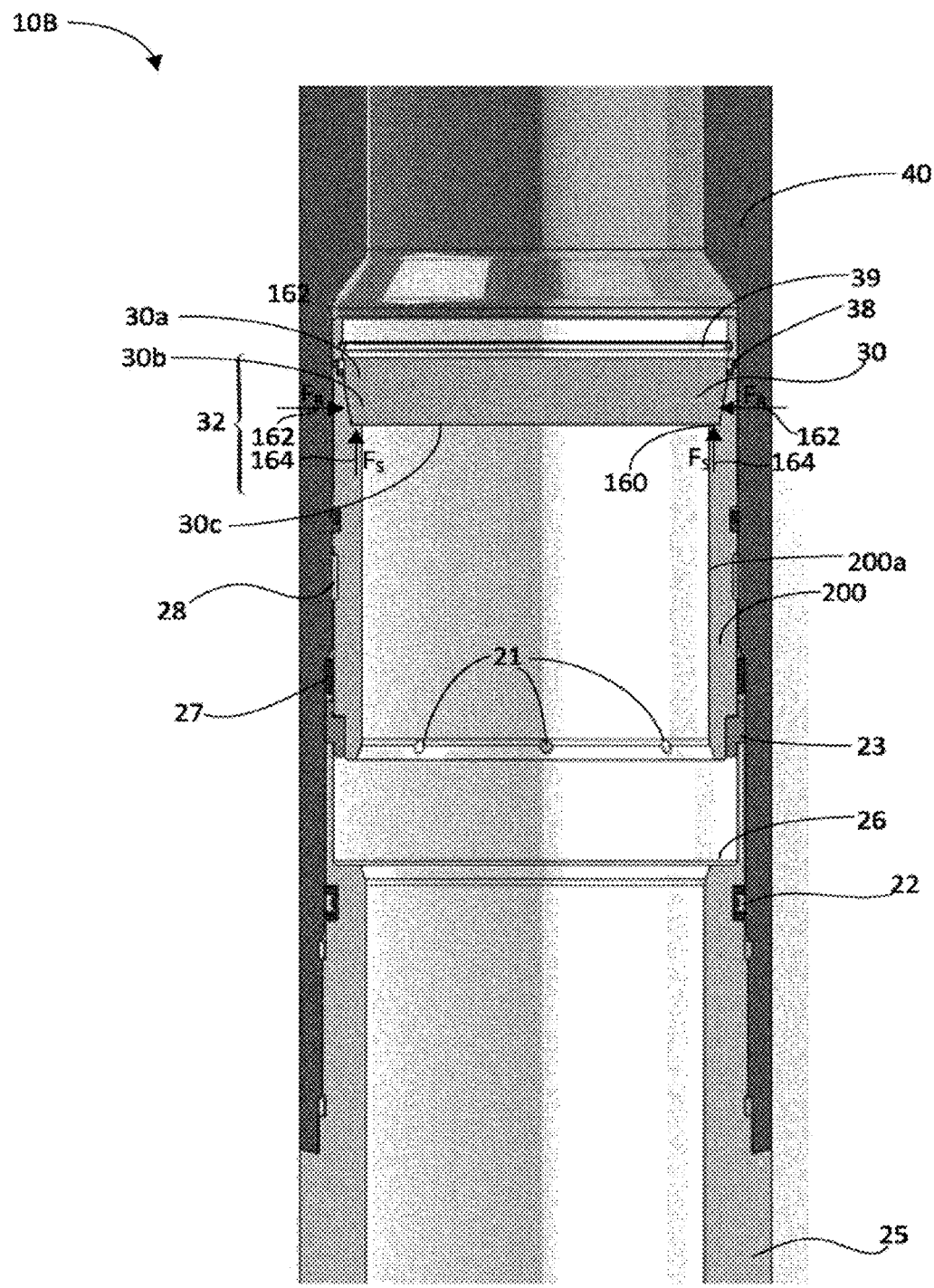
FIG. 16 is a cross-sectional drawing of the rupture disc assembly of FIG. 14, with the rupture disc in a second position.

Through providing stop shoulder 160, the maximum axial displacement of rupture disc 30 is restricted to the distance GD, where disc 30 is displaced to the position shown in FIG. 16, such that the bottom surface 30c of rupture disc 30 is in contact with stop shoulder 160. Stop shoulder 160 exerts a force $F_S$ in a direction indicated by arrow 164 at the interface of the edge surface of the rupture disc and the upper contact surface area of the stop shoulder 160 and physically prevents further axial displacement of rupture disc 30. Rupture disc 30 may reach the position shown in FIG. 16 when the disc working pressure reaches 2000 psi. Through restricting axial displacement, the amount of radial compression disc 30 may be subjected to is also limited. Thus, radial compression is maintained within an optimal range such that tensile stresses in the rupture disc 30 are significantly mitigated or canceled, without exceeding the bearing strength of the glass. Therefore, rupture disc 30 is able to withstand rapid temperature increases without undesired bursting/breaking. Thus, rupture disc 30 may only rupture due to mechanical means, such as through the failure of shear ring 23 and the related processes and apparatuses described elsewhere herein.

When stop shoulder 160 is present, for a given disc working pressure applied to the top surface of rupture disc 30, the radial compression disc 30 is subjected to may be reduced in comparison to embodiments without stop shoulder 160. Even without the effects due to the differences in rate and magnitude of thermal expansion and thermal conductivity described above between the sled 200 and rupture disc 30, shoulder stop 160 can simply limit the development of radial stresses that arise from the application of hydraulic pressure from the disc working pressure that is applied to the top surface of the rupture disc 30.

While in some embodiments the stop shoulder 160 may be a continuous circumferential shoulder/ledge, in other embodiments the stop shoulder may be discontinuous around its circumference. In other embodiments, the axial abutment feature may be other types of surface features on the inner surface of the sled which can exert an upward axial force at the lower surface of the rupture disc, conveniently but not necessarily at the circumferential edge region of the lower surface, to limit the extent of axial movement of the rupture disc 30 downwards. For example, the axial abutment feature may be a series of radially angularly spaced protrusions extending from a lower region of the inner surface of the travelling sled.

In some embodiments, rupture disc 30 is held by another kind of disc mounting apparatus/disc support mechanism than the travelling sled such as is for example described herein, but still provides a complimentary tapered supporting surface for the tapered edge surface of the rupture disc. In such embodiments, an axial abutment feature may be formed on the inner surface of such an alternate type of disc mounting apparatus/disc support mechanism.

In some embodiments, the axial abutment feature may be beneficial when used with a rupture disc 30 with a taper angle that is greater or less than the shallow angle taper ranges defined above. In a preferred embodiment, the upper limit of the taper angle of the rupture disc 30 may be 60 degrees. In another embodiment, the upper limit of the taper angle of the rupture disc 30 may be 45 degrees. In another embodiment, the taper angle of the rupture disc 30 may be in the range of 3 degrees to 30 degrees. As the taper angle of rupture disc 30 is increased, the radial compression force $F_R$ described above also increases for a given value of axial displacement, resulting in a greater amount of radial compression of rupture disc 30 for a given amount of downward axial displacement. Therefore, as the taper angle increases, stop shoulder 160 may be positioned closer to the bottom surface 30c of rupture disc 30, such that the distance GD is decreased in order to maintain radial compression within an optimal range.

According to the examples described above, the rupture disc assembly 10 functions as a temporary seal for the casing string 94 to temporarily seal the buoyant chamber 120 beneath the rupture disc assembly 10 in the casing string 94. However, it is to be understood that this is a very specific application of the rupture disc assembly 10, and that other applications of the rupture disc assembly 10 are possible and are within the scope of this disclosure. In some implementations, the rupture disc assembly 10 is used to create a temporary seal for any suitable tubing. The tubing can be a casing string as described above, a liner, or any other suitable tubing. However, other applications that may not involve any tubing are possible. More generally, the rupture disc assembly 10 can be used to create a temporary seal for any suitable vessel. The vessel can for example include any suitable tubing such as a casing string as described above, a tank, a pressure vessel, a frac port, or any other suitable vessel.

Also, while rupture disc assembly 10 can be used to create a temporary seal for a buoyant chamber in a casing string as described above, more generally, the rupture disc assembly 10 can be used to create a temporary seal for any suitable vessel. In the case of a tubing, for example, the rupture disc assembly 10 can be used for dividing two portions of the tubing as desired. In the case of a tank, for example, a rupture disc assembly 10 can be used for creating a temporary seal for the tank. The temporary seal for the tank could be employed as a safety measure, for example, to limit how much pressure is permitted inside the tank by enabling the rupture disc 30 to break before pressure inside the tank reaches a dangerous level. In the case of a frac port, for example, the rupture disc assembly 10 can be used for creating a temporary seal for the frac port.

Method of Installing Casing String

Referring back to FIG. 1, the rupture disc assembly 10, can be used in a method of installing a casing string, and in a method to float a casing during the installation of the casing string 94 in the wellbore 92. As noted above, running a casing string in a deviated wellbore, especially with long horizontal segments, can result in significant drag forces. A casing string 94 may become stuck before reaching a desired location. This is especially true when the weight of the casing string 94 in the wellbore 92 produces more drag forces than the weight tending to slide the casing string into the wellbore. When too much force is applied to push the casing string 94 into the wellbore 92, damage to the casing string can result. The present float tool helps to address one or more of these problems.

In the method of installing a casing string, the casing string 94 is initially made up at the surface. There may be one or more pup joints or similar piping installed. The landing collar is then installed on the casing string. In some implementations, drilling mud is added to ensure that the float shoe 96 is functioning properly. No fluid is added to the casing string 94 prior to installing the rupture disc assembly 10 (unless that a liquid or a gas other than air is to be used). Once a desired amount of the casing string 94 is run into the wellbore 92, the rupture disc assembly 10 is installed, trapping air within the casing between the float shoe and the rupture disc assembly. A remaining amount of the casing string 94 is run in, filling the casing string 94 with mud.

The casing string 94 is run into the wellbore 92 until friction drag on the casing string 94 with the walls of the wellbore 92 will not allow the casing string 94 to be run to a greater depth. When run to a desired or maximum depth, the float shoe 96 may be located at the heel of the well, or within the horizontal segment of the well some distance from the "toe" or bottom of the wellbore 92. The rupture disc assembly 10 may be positioned in the vertical segment 130 of the wellbore 92 or near the heel. The weight of the casing string 94 in the vertical segment 130 assists in overcoming the drag on the casing string 94, allowing the casing string 94 to be positioned to a greater depth, and/or to be moved horizontally in the wellbore 92. A disc working pressure during run-in must be less than the rupture pressure of the rupture disc 30, to prevent premature rupture of the rupture disc 30 (and must also remain below the disc failure trigger pressure). Generally, the rupture disc assembly 10 can have a pressure rating of 8,500 to 30,000 psi, for example.

Once the casing string 94 has run and landed, circulating equipment may be installed. The rupture disc 30 is then burst by pressuring the casing string 94 from the surface. To accomplish this, fluid pressure (e.g., from the surface) is applied through the casing string 94. The fluid exerts force on the rupture disc 30, and on a securing mechanism holding the rupture disc in place, as discussed above. The force and pressure when it reaches or exceeds the disc failure trigger pressure is sufficient to overcome the engagement function of the securing mechanism, triggering the rupture disc 30 to enter its failure mode by moving downward and shattering, as previously described. Once the rupture disc 30 has burst, fluid pumping is continued for a short time, and then stopped. The rupture of the rupture disc 30 should be evident from the surface by observing a pressure drop.

After the steps involved in installing the float tool into the wellbore 92 have been performed, and the rupture disc 30 has been shattered, additional operations can be performed. Fluid flow through the casing string 94 following rupture can allow air or other fluid or gas that was in the buoyant chamber 120 to rise to the surface and be vented from the casing string 94, for example. The cavity can then be filled with other fluid (e.g. non-flotation fluid). For example, the casing string 94 can be filled with drilling fluid. When the float shoe 96 is opened, conventional cementing operations can begin. It is also possible to use the float tool of the present disclosure in reverse cementing operations. In reverse cementing, a cement slurry can be pumped down the annulus 110, rather than through the casing string 94. When cementing operations are performed, a cement plug is delivered through the casing string 94.

Once the rupture disc 30 has been ruptured, an inside diameter of the casing string 94 in the region of the rupture disc assembly 10 is substantially the same as that in the remainder of the casing string 94. One way to accomplish this may be to have the rupture disc installed in a widened region of the casing string 94 (e.g. within radially expanded portions of one or more tubulars, the tubulars being connectable to other tubulars in the casing string 94). In other words, the tubular string can be adapted to accommodate a diameter of the rupture disc 30. The ability to restore the inside diameter is useful since downhole tools and the like can be deployed without restriction into the casing string 94 once the rupture disc 30 has been removed, and since further work can be done without the need to remove any part of the float tool. Further, because the inside diameter is restored, the present method and the float tool are ideal for use in ball-drop systems.

Numerous modifications and variations of the present disclosure are possible in light of the above teachings. It is therefore to be understood that within the scope of the appended claims, the disclosure may be practised otherwise than as specifically described herein.

The invention claimed is:

1. A rupture disc assembly for use in making a temporary seal in a vessel, the rupture disc assembly comprising:
   a rupture disc having a top surface, a bottom surface, and a side surface having a length extending between the top surface and the bottom surface, the side surface having a tapered portion tapering inwardly towards the bottom surface of the rupture disc, the tapered portion extending over at least 50% and less than 100% of the length of the side surface; and
   a mounting apparatus configured to support the rupture disc, with the mounting apparatus and the rupture disc operable to form a temporary seal in the vessel, the mounting apparatus having a tapered supporting surface that is complementary to the tapered portion of the side surface of the rupture disc, and the side surface of the rupture disc and the supporting surface of the mounting apparatus being operable to permit transmission of radial compressive forces from the mounting apparatus to the rupture disc;
   wherein the rupture disc is adapted to remain intact when the top surface of the rupture disc is subjected to a first disc working pressure during a first operational mode of the rupture disc assembly, the first disc working pressure being below a disc rupture pressure, and wherein the rupture disc is operable to break during a second operational mode of the rupture disc assembly.

2. The rupture disc assembly of claim 1, wherein the tapered portion extends over more than 50% of the length of the side surface.

3. The rupture disc assembly of claim 1, wherein the tapered portion extends between 50% and 90% of the length of the side surface.

4. The rupture disc assembly of claim 1, wherein the tapered portion tapers inwardly by a tapering angle of less than 45 degrees relative to a longitudinal axis of the rupture disc.

5. The rupture disc assembly of claim 4, wherein the tapering angle is between 5 and 35 degrees.

6. The rupture disc assembly of claim 1, wherein the side surface comprises a cylindrical portion extending between the tapered portion and the top surface, and wherein the tapered portion extends between the cylindrical portion and the bottom surface.

7. The rupture disc assembly of claim 6, wherein the cylindrical portion has a generally constant diameter and extends over less than 50% of the length of the side surface.

8. The rupture disc assembly of claim 7, wherein the cylindrical portion extends along the side surface by a first length, and the tapered portion extends along the side surface by a second length, the first length being at least half of the second length.

9. The rupture disc assembly of claim 8, wherein the first length and the second length together define 100% of the length of the side surface.

10. An apparatus for forming a temporary seal in a vessel, the apparatus comprising:
    a rupture disc having a sealing mode and a disc failure mode, and wherein the rupture disc has a top surface, a bottom surface, and a side surface having a length extending between the top surface and the bottom surface, the side surface having a tapered portion tapering inwardly towards the bottom surface of the rupture disc, the tapered portion extending over at least 50% of the length of the side surface;
    a disc support mechanism comprising a tapered wall surface operable for mating force transmission with the tapered portion of the rupture disc when the rupture disc is in the sealing mode, wherein the rupture disc is adapted to remain intact in response to application of pressure on the top surface of the rupture disc in the sealing mode;
    a disc failure activation mechanism operable to selectively cause the rupture disc to change from the sealing mode to the disc failure mode, such that when the rupture disc changes to the disc failure mode the rupture disc breaks in response to application of the pressure on the top surface of the rupture disc; and
    an axial abutment surface feature configured and operable to limit downward axial movement of the rupture disc relative to the disc support mechanism and thus be operable to restrict an amount of radial compression the tapered wall surface of the disc support mechanism is adapted to exert on at least a portion of the rupture disc when the top surface of the rupture disc is subjected to the pressure in the sealing mode.

11. The apparatus of claim 10, wherein the side surface comprises a cylindrical portion extending between the tapered portion and the top surface, and wherein the tapered portion extends between the cylindrical portion and the bottom surface, and wherein the cylindrical portion extends along the side surface by a first length, and the tapered portion extends along the side surface by a second length, the first length being at least half of the second length.

12. The apparatus of claim 11, wherein the cylindrical portion has a generally constant diameter and extends over less than 50% of the length of the side surface.

13. The apparatus of claim 11, wherein the first length and the second length together define 100% of the length of the side surface.

14. A rupture disc assembly for use in making a temporary seal in a vessel, the rupture disc assembly comprising:
    a rupture disc having a top surface, a bottom surface, and a side surface having a surface length extending between the top surface and the bottom surface, the rupture disc having a cylindrical portion and a truncated conical portion, the cylindrical portion being defined between the top surface and the truncated conical portion and extending therebetween by a first length, the truncated conical portion being defined between the cylindrical portion and the bottom surface and extending therebetween by a second length, the first length being shorter than the second length; and a mounting apparatus configured to support the rupture disc, with the mounting apparatus and the rupture disc operable to form a temporary seal in the vessel, the mounting apparatus having a tapered supporting surface that is complementary to the truncated conical portion of the rupture disc, and the truncated conical portion and the supporting surface of the mounting apparatus being operable to permit transmission of radial compressive forces from the mounting apparatus to the rupture disc;

wherein the rupture disc is adapted to remain intact when the top surface of the rupture disc is subjected to a first disc working pressure during a first operational mode of the rupture disc assembly, the first disc working pressure being below a disc rupture pressure, and wherein the rupture disc is operable to break during a second operational mode of the rupture disc assembly.

15. The rupture disc assembly of claim 14, wherein the second length of the truncated conical portion corresponds to more than 50% of the surface length of the side surface.

16. The rupture disc assembly of claim 14, wherein the first length is at least half the second length.

17. The rupture disc assembly of claim 14, wherein the first length and the second length together define 100% of the surface length of the side surface.

18. The rupture disc assembly of claim 14, wherein the truncated conical portion tapers inwardly towards the bottom surface by a tapering angle of less than 45 degrees relative to a longitudinal axis of the rupture disc.

* * * * *